United States Patent
Yamagata et al.

(10) Patent No.: US 12,134,802 B2
(45) Date of Patent: *Nov. 5, 2024

(54) GRAIN-ORIENTED ELECTRICAL STEEL SHEET, METHOD FOR MANUFACTURING GRAIN-ORIENTED ELECTRICAL STEEL SHEET, AND ANNEALING SEPARATOR UTILIZED FOR MANUFACTURE OF GRAIN-ORIENTED ELECTRICAL STEEL SHEET

(71) Applicant: NIPPON STEEL CORPORATION, Tokyo (JP)

(72) Inventors: Ryutaro Yamagata, Tokyo (JP); Ichiro Tanaka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 603 days.

This patent is subject to a terminal disclaimer.

(21) Appl. No.: 17/421,232

(22) PCT Filed: Jan. 8, 2020

(86) PCT No.: PCT/JP2020/000340
§ 371 (c)(1),
(2) Date: Jul. 7, 2021

(87) PCT Pub. No.: WO2020/145316
PCT Pub. Date: Jul. 16, 2020

(65) Prior Publication Data
US 2022/0119904 A1    Apr. 21, 2022

(30) Foreign Application Priority Data
Jan. 8, 2019  (JP) ................. 2019-001181

(51) Int. Cl.
| | |
|---|---|
| *C21D 9/46* | (2006.01) |
| *C21D 8/12* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/60* | (2006.01) |
| *C23C 28/04* | (2006.01) |

(52) U.S. Cl.
CPC ............. *C21D 9/46* (2013.01); *C21D 8/1222* (2013.01); *C21D 8/1233* (2013.01); *C21D 8/1255* (2013.01); *C21D 8/1272* (2013.01); *C21D 8/1283* (2013.01); *C22C 38/001* (2013.01); *C22C 38/002* (2013.01); *C22C 38/02* (2013.01); *C22C 38/04* (2013.01); *C22C 38/06* (2013.01); *C22C 38/60* (2013.01); *C23C 28/04* (2013.01); *C21D 2201/05* (2013.01)

(58) Field of Classification Search
None
See application file for complete search history.

(56) References Cited

U.S. PATENT DOCUMENTS

| | | |
|---|---|---|
| 2009/0047537 A1 | 2/2009 | Nanba et al. |
| 2010/0055481 A1 | 3/2010 | Kuso et al. |
| 2018/0010206 A1 | 1/2018 | Kwon et al. |
| 2018/0258508 A1 | 9/2018 | Fujimura et al. |
| 2019/0390350 A1 | 12/2019 | Umada et al. |
| 2020/0017930 A1 | 1/2020 | Song et al. |

FOREIGN PATENT DOCUMENTS

| | | |
|---|---|---|
| JP | 6-88171 A | 3/1994 |
| JP | 8-269552 A | 10/1996 |
| JP | 2005-290446 A | 10/2005 |
| JP | 2008-127634 A | 6/2008 |
| JP | 2009-270129 A | 11/2009 |
| JP | 2012-214902 A | 11/2012 |
| WO | WO 2008/062853 A1 | 5/2008 |
| WO | WO 2016/105053 A1 | 6/2016 |
| WO | WO 2018/116831 A1 | 6/2018 |
| WO | WO 2018/117639 A1 | 6/2018 |

*Primary Examiner* — Anthony M Liang
(74) *Attorney, Agent, or Firm* — Birch, Stewart, Kolasch & Birch, LLP

(57) ABSTRACT

Grain-oriented electrical steel sheet excellent in magnetic properties and excellent in adhesion of the primary coating to the steel sheet is provided. The grain-oriented electrical steel sheet according to the present invention is provided with a base metal steel sheet containing a chemical composition containing, by mass %, C: 0.005% or less, Si: 0.5 to 7.0%, Mn: 0.05 to 1.00%, a total of S and Se: 0.005% or less, sol. Al: 0.005% or less, and N: 0.005% or less and having a balance comprised of Fe and impurities and with a primary coating formed on a surface of the base metal steel sheet and containing $Mg_2SiO_4$ as a main constituent, wherein a peak position of Al emission intensity obtained when performing elemental analysis by glow discharge optical emission spectrometry from a surface of the primary coating in a thickness direction of the grain-oriented electrical steel sheet is arranged within a range of 2.0 to 12.0 μm from the surface of the primary coating in the thickness direction, and a number density of Al oxides of a size of 0.1 μm or more in terms of a circle equivalent diameter based on the area at the peak position of Al emission intensity is 0.03 to 0.2/μm².

5 Claims, No Drawings

GRAIN-ORIENTED ELECTRICAL STEEL SHEET, METHOD FOR MANUFACTURING GRAIN-ORIENTED ELECTRICAL STEEL SHEET, AND ANNEALING SEPARATOR UTILIZED FOR MANUFACTURE OF GRAIN-ORIENTED ELECTRICAL STEEL SHEET

FIELD

The present invention relates to grain-oriented electrical steel sheet, a method for manufacturing grain-oriented electrical steel sheet, and an annealing separator utilized for manufacture of grain-oriented electrical steel sheet.

BACKGROUND

Grain-oriented electrical steel sheet is steel sheet containing, by mass %, Si in 0.5 to 7% or so and having crystal orientations controlled to the {110}<001> orientation (Goss orientation). For control of the crystal orientations, the phenomenon of catastrophic grain growth called secondary recrystallization is utilized.

The method for manufacturing grain-oriented electrical steel sheet is as follows: A slab is heated and hot rolled to produce hot rolled steel sheet. The hot rolled steel sheet is annealed according to need. The hot rolled steel sheet is pickled. The pickled hot rolled steel sheet is cold rolled by a cold rolling rate of 80% or more to produce cold rolled steel sheet. The cold rolled steel sheet is decarburization annealed to cause primary recrystallization. The decarburization annealed cold rolled steel sheet is finish annealed to cause secondary recrystallization. Due to the above process, grain-oriented electrical steel sheet is produced.

After the above-mentioned decarburization annealing and before the finish annealing, the surface of the cold rolled steel sheet is coated with an aqueous slurry containing an annealing separator having MgO as a main constituent and is then dried. The cold rolled steel sheet with the annealing separator dried on it is taken up into a coil, then is finish annealed. At the time of finish annealing, the MgO in the annealing separator and the $SiO_2$ in the internal oxide layer formed on the surface of the cold rolled steel sheet at the time of decarburization annealing react whereby a primary coating having $Mgt\ SiO_4$(forsterite) as a main constituent is formed on the surface. After forming the primary coating, the primary coating is, for example, formed with an insulating coating (also referred to as a "secondary coating") comprised of colloidal silica and a phosphate. The primary coating and insulating coating are smaller in heat expansion coefficient than the steel sheet. For this reason, the primary coating, together with the insulating coating, imparts tension to the steel sheet to reduce the core loss. The primary coating, furthermore, raises the adhesion of the insulating coating on the steel sheet. Therefore, the adhesion of the primary coating on the steel sheet is preferably higher.

On the other hand, lowering the core loss of grain-oriented electrical steel sheet is effective for raising the magnetic flux density and lowering the hysteresis loss.

To raise the magnetic flux density of grain-oriented electrical steel sheet, it is effective to control the crystal orientations of the base metal steel sheet to the Goss orientation. Art for improving integration to the Goss orientation is proposed in PTLs 1 to 3. In these patent literature, elements improving the magnetic properties which strengthen the action of the inhibitors (Sn, Sb, Bi, Te, Pb, Se, etc.) are contained in the steel sheet. Due to this, integration to the Goss orientation rises and the magnetic flux density can be raised.

However, if steel sheet contains elements improving the magnetic properties, parts of the primary coating will aggregate, so the interface between the steel sheet and the primary coating will easily become flattened. In this case, the adhesion of the primary coating with the steel sheet will fall.

Art for raising the adhesion of a primary coating with a steel sheet is described in PTLs 4, 5, 6, and 7.

In PTL 4, the slab is made to contain Ce in 0.001 to 0.1% and the surface of the steel sheet is formed with a primary coating containing Ce in 0.01 to 1000 $mg/m^2$. In PTL 5, in grain-oriented electrical steel sheet containing Si: 1.8 to 7% and having a primary coating having $Mgt\ SiO_4$ as a main constituent, the primary coating is made to contain Ce in a basis weight per side of 0.001 to 1000 $mg/m^2$.

In PTL 6, a primary coating is made to be formed characterized by the primary coating containing one or more types of alkali earth metal compounds selected from Ca, Sr, and Ba and rare earth elements by making the annealing separator having MgO as a main constituent contain compounds including a rare earth metal element compound in 0.1 to 10%, one or more types of alkali earth metal compounds selected from Ca, Sr, and Ba in 0.1 to 10%, and a sulfur compound in 0.01 to 5%.

In PTL 7, a primary coating is made to be formed characterized by containing compounds including one or more elements selected from Ca, Sr, and Ba, rare earth metal element compounds in 0.1 to 1.0%, and sulfur.

CITATIONS LIST

Patent Literature

[PTL 1] Japanese Unexamined Patent Publication No. 6-88171
[PTL 2] Japanese Unexamined Patent Publication No. 8-269552
[PTL 3] Japanese Unexamined Patent Publication No. 2005-290446
[PTL 4] Japanese Unexamined Patent Publication No. 2008-127634
[PTL 5] Japanese Unexamined Patent Publication No. 2012-214902
[PTL 6] WO No. 2008/062853
[PTL 7] Japanese Unexamined Patent Publication No. 2009-270129

SUMMARY

Technical Problem

However, if making the annealing separator contain the Y, La, Ce, or other rare earth element compounds to form a primary coating containing Y, La, and Ce, the magnetic properties sometimes fall. Further, if the number densities of particles of the Y, La, Ce, or other rare earth element compounds or the Ca, Sr, Ba, or other additives in the raw material powder of the annealing separator are insufficient, sometimes regions where the primary coating has insufficiently developed will arise and the adhesion of the primary coating will fall.

An object of the present invention is to provide grain-oriented electrical steel sheet excellent in magnetic properties and excellent in adhesion of the primary coating to the base metal steel sheet, a method for manufacturing grain-oriented electrical steel sheet, and an annealing separator utilized for manufacture of grain-oriented electrical steel sheet.

Solution to Problem

The grain-oriented electrical steel sheet according to the present invention comprises a base metal steel sheet having a chemical composition containing, by mass %, C: 0.005% or less, Si: 2.5 to 4.5%, Mn: 0.02 to 0.2%, one or more elements selected from the group comprised of S and Se: total of 0.005% or less, sol. Al: 0.01% or less, and N: 0.01% or less and having a balance comprised of Fe and impurities and a primary coating formed on a surface of the base metal steel sheet and containing $Mg_2SiO_4$ as a main constituent, where a peak position of Al emission intensity obtained when performing elemental analysis by glow discharge optical emission spectrometry from a surface of the primary coating in a thickness direction of the grain-oriented electrical steel sheet is arranged within a range of 2.0 to 12.0 μm from the surface of the primary coating in the thickness direction and a number density of Al oxides of a size of 0.2 μm or more in terms of a circle equivalent diameter based on the area at the peak position of Al emission intensity is 0.03 to 0./μm².

The method for manufacturing grain-oriented electrical steel sheet according to the present invention comprises a process for cold rolling hot rolled steel sheet containing by mass %, C: 0.1% or less, Si: 2.5 to 4.5%, Mn: 0.02 to 0.2%, one or more elements selected from the group comprised of S and Se: total of 0.005 to 0.07%, sol. Al: 0.005 to 0.05%, and N: 0.001 to 0.030% and having a balance comprised of Fe and impurities by a cold rolling rate of 80% or more to manufacture cold rolled steel sheet used as a base metal steel sheet, a process for decarburization annealing the cold rolled steel sheet, a process for coating the surface of the cold rolled steel sheet after decarburization annealing with an aqueous slurry containing an annealing separator and drying the aqueous slurry on the surface of the cold rolled steel sheet in a 400 to 1000° C. furnace, and a process for performing finish annealing on the cold rolled steel sheet after the aqueous slurry has been dried. The annealing separator contains MgO, at least one or more types of compounds of metal selected from a group comprised of Y, La, and Ce, and at least one or more types of compounds of metal selected from a group comprised of Ti, Zr, and Hf, when a content of the MgO in the annealing separator is defined as 100% by mass %, a total content of the compounds of metal selected from a group comprised of Y, La, and Ce converted to oxides is 0.5 to 8.0%, a total content of the compounds of metal selected from a group comprised of Ti, Zr, and Hf converted to oxides is 0.5 to 10.0%, further, a total of a total content of the compounds of metal selected from a group comprised of Y, La, and Ce converted to oxides and a total content of the compounds of metal selected from a group comprised of Ti, Zr, and Hf converted to oxides is 2.0 to 14.0%, further a ratio of a sum of the numbers of Ti, Zr, and Hf atoms and a sum of the numbers of Y, La, and Ce atoms contained in the annealing separator is 0.15 to 4.00, further a number density of particles of the compounds of metal selected from the group comprised of Y, La, and Ce which are particles of a spherical equivalent diameter based on volume of 0.1 μm or more is 2,000,000,000/g or more, and further a number density of particles of the compounds of metal selected from the group comprised of Ti, Zr, and Hf which are particles of a spherical equivalent diameter based on volume of 0.1 μm or more is 2,000,000,000/g or more.

An annealing separator used for manufacture of the grain-oriented electrical steel sheet according to the present invention contains MgO, at least one or more types of compounds of metal selected from a group comprised of Y, La, and Ce, and at least one or more types of compounds of metal selected from a group comprised of Ti, Zr, and Hf, wherein when a content of the MgO in the annealing separator is defined as 100% by mass %, a total content of the compounds of metal selected from a group comprised of Y, La, and Ce converted to oxides is 0.5 to 8.0%, a total content of the compounds of metal selected from a group comprised of Ti, Zr, and Hf converted to oxides is 0.5 to 10.0%, further, a total of a total content of the compounds of metal selected from a group comprised of Y, La, and Ce converted to oxides and a total content of the compounds of metal selected from a group comprised of Ti, Zr, and Hf converted to oxides is 2.0 to 14.0%, further a ratio of a sum of the numbers of Y, La, and Ce atoms with respect to a sum of the numbers of Ti, Zr, and Hf atoms contained in the annealing separator is 0.15 to 4.00, further a number density of particles of the compounds of metal selected from the group comprised of Y, La, and Ce which are particles of a spherical equivalent diameter based on volume of 0.1 μm or more is 2,000,000,000/g or more, and further a number density of particles of the compounds of metal selected from the group comprised of Ti, Zr, and Hf which are particles of a spherical equivalent diameter based on volume of 0.1 μm or more is 2,000,000,000/g or more.

Advantageous Effects of Invention

The grain-oriented electrical steel sheet according to the present invention is excellent in magnetic properties and excellent in adhesion of a primary coating to a base metal steel sheet. The method of manufacture according to the present invention can manufacture the above-mentioned grain-oriented electrical steel sheet. The annealing separator according to the present invention is applied to the above method of manufacture. Due to this, grain-oriented electrical steel sheet can be manufactured.

DESCRIPTION OF EMBODIMENTS

The inventors investigated and studied the magnetic properties of grain-oriented electrical steel sheet containing elements for improving the magnetic properties and the adhesion of primary coatings formed by including a Y compound, La compound, and Ce compound in the annealing separator. As a result, the inventors obtained the following findings.

There are anchoring structures at the interface of the primary coating and steel sheet of the grain-oriented electrical steel sheet. Specifically, near the interface of the primary coating and steel sheet, the roots of the primary coating spread down to the inside of the steel sheet. The more the roots of the primary coating penetrate to the inside of the steel sheet, the higher the adhesion of the primary coating to the steel sheet. Furthermore, the more dispersed the roots of the primary coating inside the steel sheet (the more they are spread), the higher the adhesion of the primary coating to the steel sheet.

On the other hand, if the roots of the primary coating penetrate to the inside of the steel sheet too much, the roots of the primary coating will obstruct the secondary recrystallization in the Goss orientation. Therefore, crystal grains with random orientations will increase at the surface layer. Furthermore, the roots of the primary coating become factors inhibiting domain wall movement and the magnetic properties deteriorate. Similarly, if the roots of the primary coating are excessively dispersed inside of the steel sheet, the roots of the primary coating will obstruct the secondary recrystallization in the Goss orientation and crystal grains with random orientations will increase at the surface layer. Furthermore, the roots of the primary coating become factors inhibiting domain wall movement and the magnetic properties deteriorate.

Based on the above findings, the inventors further investigated the state of the roots of the primary coating, the magnetic properties of the grain-oriented electrical steel sheet, and the adhesion of the primary coating.

If the annealing separator is made to contain a Y compound, La compound, and Ce compound to form the primary coating, as explained above, the magnetic properties fall. This is believed to be because the roots of the primary coating penetrate into the steel sheet too deeply and obstruct domain wall movement.

Therefore, the inventors experimented with lowering the contents of the Y compound, La compound, and Ce compound in the annealing separator having MgO as the main constituent and instead including a Ti compound, Zr compound, and Hf compound to form the primary coating and experimented with making the number density of the particles of these compounds in the annealing separator before prepared into the aqueous slurry (raw material powder) a higher density. As a result, they discovered that sometimes the magnetic properties of the grain-oriented electrical steel sheet are improved and the adhesion of the primary coating is also raised. The inventors further adjusted the contents of the Y compound, La compound, and Ce compound and the contents of the Ti compound, Zr compound, and Hf compound in the mainly MgO annealing separator to investigate the depth and state of dispersion of the roots of the primary coating.

The main constituent of the roots of the primary coating is an Al oxide such as spinel ($MgAl_2O_4$). The depth position from the surface of the peak of the Al emission intensity obtained by performing elemental analysis based on glow discharge optical emission spectrometry (GDS) from the surface of the grain-oriented electrical steel sheet in the thickness direction (below, this referred to as "the Al peak position $D_{Al}$") is believed to show the position of existence of the spinel, that is, the position of the roots of the primary coating. Further, the number density of Al oxides as represented by spinel of a size of 0.2 μm or more by circle equivalent diameter based on area at the Al peak position $D_{Al}$ (below, referred to as "the Al oxide number density ND") is believed to show the state of dispersion of the roots of the primary coating.

The inventors engaged in further studies and as a result discovered that if the Al peak position $D_{Al}$ is 2.0 to 12.0 μm and the Al oxide number density ND is 0.03 to 0.2/μm², the roots of the primary coating are suitable in length and suitable in state of dispersion, so excellent magnetic properties and adhesion of the primary coating are obtained.

The above-mentioned suitable ranges of the Al peak position $D_{Al}$ and the Al oxide number density ND can be obtained, as explained above, by adjusting to suitable ranges the contents of the Y, La, and Ce compounds and the contents of Ti, Zr, and Hf compounds in the annealing separator and also the number density of particles of compounds of metal selected from the group comprised of Ya, La, and Ce and the number density of particles of compounds of metal selected from the group comprised of Ti, Zr, and Hf in the raw material powder before preparation of the annealing separator to an aqueous slurry.

Further, the inventors investigated the ratio between the total mass % $C_{RE}$ of the Y, La, and Ce compounds converted to oxides when defining the content of MgO as 100% (explained later) and the total mass % $C_{G4}$ of the Ti, Zr, and Hf compounds converted to oxides when defining the content of MgO as 100% (explained later) in the mainly MgO annealing separator and the Al oxide number density ND (/μm²) in an image showing the distribution of Al obtained by EDS analysis in a glow discharge mark region at the Al peak position $D_{Al}$. As a result, it was learned that the Al oxide number density ND can be controlled by adjusting the contents of compounds of metal selected from the group comprised of Y, La, and Ce converted to oxides and the contents of compounds of metal selected from the group comprised of Ti, Zr, and Hf converted to oxides in the annealing separator.

The inventors engaged in further studies and as a result discovered that if using an annealing separator containing MgO, at least one or more types of compounds of metal selected from a group comprised of Y, La, and Ce, and at least one or more types of compounds of metal selected from a group comprised of Ti, Zr, and Hf, wherein when a content of the MgO is defined as 100% by mass %, a total content of the compounds of metal selected from a group comprised of Y, La, and Ce converted to oxides is 0.5 to 8.0%, a total content of the compounds of metal selected from a group comprised of Ti, Zr, and Hf converted to oxides is 0.5 to 10.0%, further, a total of the total content of the compounds of metal selected from a group comprised of Y, La, and Ce converted to oxides and the total content of the compounds of metal selected from a group comprised of Ti, Zr, and Hf converted to oxides is 2.0 to 14.0%, further a ratio of a sum of the numbers of Ti, Zr, and Hf atoms and a sum of the numbers of Y, La, and Ce atoms contained in the annealing separator is 0.15 to 4.00, and using a powder of the compounds of metal selected from the group comprised of Y, La, and Ce and a powder of the compounds of metal selected from the group comprised of Ti, Zr, and Hf with number densities of particles of a particle size of 0.1 μm or more in the raw material powder before preparing the annealing separator into an aqueous slurry of respectively 2,000,000,000/g or more, even in grain-oriented electrical steel sheet manufactured from hot rolled steel sheet containing elements improving the magnetic flux density (Sn, Sb, Bi, Te, Pb, etc.), the Al peak position $D_{Al}$ becomes 2.0 to 12.0 lam and the number density ND of Al oxides of a size of 0.2 μm or more by circle equivalent diameter based on area becomes 0.03 to 0.2/μm², and excellent magnetic properties and adhesion of the primary coating are obtained.

The grain-oriented electrical steel sheet according to the present invention completed based on the above findings is provided with a base metal steel sheet having a chemical composition containing, by mass %, C: 0.005% or less, Si: 2.5 to 4.5%, Mn: 0.02 to 0.2%, one or more elements selected from the group comprised of S and Se: total of 0.005% or less, sol. Al: 0.01% or less, and N: 0.01% or less and having a balance comprised of Fe and impurities and a primary coating formed on a surface of the base metal steel sheet and containing $Mg_2SiO_4$ as a main constituent. A peak position of Al emission intensity obtained when performing elemental analysis by glow discharge optical emission spectrometry from a surface of the primary coating in a thickness direction of the grain-oriented electrical steel sheet is arranged within a range of 2.0 to 12.0 μm from the surface of the primary coating in the thickness direction, and a number density of Al oxides at a peak position of Al emission intensity is 0.03 to 0.2/μm².

The method for manufacturing grain-oriented electrical steel sheet according to the present invention comprises a process for cold rolling hot rolled steel sheet containing by mass %, C: 0.1% or less, Si: 2.5 to 4.5%, Mn: 0.02 to 0.2%, one or more elements selected from the group comprised of S and Se: total of 0.005 to 0.07%, sol. Al: 0.005 to 0.05%, and N: 0.001 to 0.030% and having a balance comprised of Fe and impurities by a cold rolling rate of 80% or more to manufacture cold rolled steel sheet used as a base metal steel sheet, a process for decarburization annealing the cold rolled steel sheet, a process for coating the surface of the cold rolled steel sheet after decarburization annealing with an aqueous slurry containing an annealing separator and drying the aqueous slurry on the surface of the cold rolled steel sheet in a 400 to 1000° C. furnace, and a process for performing finish annealing on the cold rolled steel sheet after the aqueous slurry has been dried. The annealing separator contains MgO, at least one or more types of compounds of metal selected from a group comprised of Y, La, and Ce, and at least one or more types of compounds of metal selected from a group comprised of Ti, Zr, and Hf, when a content of the MgO in the annealing separator is defined as 100% by mass %, a total content of the compounds of metal selected from a group comprised of Y, La, and Ce converted to oxides is 0.5 to 8.0%, a total content of the compounds of metal selected from a group comprised of Ti, Zr, and Hf converted to oxides is 0.5 to 10.0%, further, a total of a total content of the compounds of metal selected from a group comprised of Y, La, and Ce converted to oxides and a total content of the compounds of metal selected from a group comprised of Ti, Zr, and Hf converted to oxides is 2.0 to 14.0%, further a ratio of a sum of the numbers of Ti, Zr, and Hf atoms and a sum of the numbers of Y, La, and Ce atoms contained in the annealing separator is 0.15 to 4.00, and further, in the raw material powder before preparing the annealing separator into an aqueous slurry, number densities of particles of the compound of metal selected from the group comprised of Y, La, and Ce and number densities of particles of a particle size of 0.1 μm or more of the compound of metal selected from the group comprised of Ti, Zr, and Hf in the raw material powder are respectively 2,000,000,000/g or more. However, the particles sizes are spherical equivalent diameters based on volume.

The annealing separator may further contain one or two or more types of compounds of metal selected from a group comprised of Ca, Sr, and Ba in a range of a ratio of a sum of the numbers of Ca, Sr, and Ba atoms with respect to the number of Mg atoms contained in the annealing separator of less than 0.025.

In the above method for manufacturing grain-oriented electrical steel sheet, the chemical composition of the hot rolled steel sheet may further contain, in place of part of the Fe, one or more elements selected from a group comprised of Cu, Sb and Sn in a total of 0.6% or less.

In the above method for manufacturing grain-oriented electrical steel sheet, the chemical composition of the hot rolled steel sheet further contains, in place of part of the Fe, one or more elements selected from a group comprised of Bi, Te, and Pb in a total of 0.03% or less.

The annealing separator according to the present invention is used for manufacture of grain-oriented electrical steel sheet. The annealing separator contains MgO, at least one or more types of compounds of metal selected from a group comprised of Y, La, and Ce and at least one or more types of compounds of metal selected from a group comprised of Ti, Zr, and Hf, where when a content of the MgO in the annealing separator is defined as 100% by mass %, a total content of the compounds of metal selected from a group comprised of Y, La, and Ce converted to oxides is 0.5 to 8.0%, a total content of the compounds of metal selected from a group comprised of Ti, Zr, and Hf converted to oxides is 0.5 to 10.0%, further, a total of a total content of the compounds of metal selected from a group comprised of Y, La, and Ce converted to oxides and a total content of the compounds of metal selected from a group comprised of Ti, Zr, and Hf converted to oxides is 2.0 to 14.0%, further a ratio of a sum of the numbers of Ti, Zr, and Hf atoms and a sum of the numbers of Y, La, and Ce atoms contained in the annealing separator is 0.15 to 4.00, and further a number density of particles of the compound of metal selected from the group comprised of Y, La, and Ce of a particle size of 0.1 μm or more in the raw material powder and a number density of particles of the compound of metal selected from the group comprised of Ti, Zr, and Hf of a particle size of 0.1 μm or more in the raw material powder before preparing the annealing separator into an aqueous slurry are respectively 2,000,000,000/g or more. However, the particles sizes are spherical equivalent diameters based on volume.

The annealing separator may further contain one or two or more types of compounds of metal selected from a group comprised of Ca, Sr, and Ba in a range of a ratio of a sum of the numbers of Ca, Sr, and Ba atoms with respect to the number of Mg atoms contained in the annealing separator of less than 0.025.

Below, the grain-oriented electrical steel sheet, method for manufacturing grain-oriented electrical steel sheet, and annealing separator used for manufacture of grain-oriented electrical steel sheet according to the present invention will be explained in detail. In this Description, the "%" regarding the contents of elements forming the steel sheet will mean "mass %" unless otherwise indicated. Further, regarding the numerical values A and B, the expression "A to B" shall mean "A or more and B or less". In this expression, when only the numerical value B is assigned a unit, that unit shall also apply to the numerical value A.

Constitution of Grain-Oriented Electrical Steel Sheet

The grain-oriented electrical steel sheet according to one aspect of the present invention is provided with a base metal steel sheet and a primary coating formed on the surface of the base metal steel sheet.

Chemical Composition of Base Metal Steel Sheet

The chemical composition of the base metal steel sheet forming the above-mentioned grain-oriented electrical steel sheet contains the following elements. Note that, as explained in the following method for manufacture, the base metal steel sheet is manufactured by cold rolling using hot rolled steel sheet having the later explained chemical composition.

C: 0.005% or less

Carbon (C) is an element effective for control of the microstructure up to completion of the decarburization annealing in the manufacturing process, but if the content of C is over 0.005%, the magnetic properties of the grain-oriented electrical steel sheet of the final product sheet fall. Therefore, the content of C is 0.005% or less. The content of C is preferably as low as possible. However, even if reducing the content of C to less than 0.0001%, the manufacturing costs just build up. The above effect does not change much at all. Therefore, the preferable lower limit of the content of C is 0.0001%.

Si: 2.5 to 4.5%

Silicon (Si) raises the electrical resistance of steel to reduce the eddy current loss. If the content of Si is less than 2.5%, the above effect is not sufficiently obtained. On the other hand, if the content of Si is over 4.5%, the cold workability of the steel falls. Therefore, the content of Si is 2.5 to 4.5%. The preferable lower limit of the content of Si is 2.6%, more preferably 2.8%. The preferable upper limit of the content of Si is 4.0%, more preferably 3.8%.

Mn: 0.02 to 0.2%

Manganese (Mn) bonds with the later explained S and Se in the manufacturing process to form MnS and MnSe. These precipitates function as inhibitors (inhibitors of normal crystal grain growth) and in steel cause secondary recrystallization. Mn further raises the hot workability of steel. If the content of Mn is less than 0.02%, the above effect is not sufficiently obtained. On the other hand, if the content of Mn is over 0.2%, secondary recrystallization does not occur and the magnetic properties of the steel fall. Therefore, the content of Mn is 0.02 to 0.2%. The preferable lower limit of the content of Mn is 0.03%, more preferably 0.04%. The preferable upper limit of the content of Mn is 0.13%, more preferably 0.10%.

One or more elements selected from the group comprised of S and Se: total of 0.005% or less Sulfur (S) and selenium (Se) bond with Mn in the manufacturing process to form MnS and MnSe functioning as inhibitors. However, if the contents of these elements are over a total of 0.005%, due to the remaining inhibitors, the magnetic properties fall. Furthermore, due to segregation of S and Se, in grain-oriented electrical steel sheet, sometimes surface defects are caused. Therefore, in grain-oriented electrical steel sheet, the total content of the one or more elements selected from the group comprised of S and Se is 0.005% or less. The total of the contents of S and Se in the grain-oriented electrical steel sheet is preferably as low as possible. However, even if reducing the total of the content of S and the content of Se in the grain-oriented electrical steel sheet to less than 0.0005%, the manufacturing costs just build up. The above effect does not change much at all. Therefore, the preferable lower limit of the total content of the one or more elements selected from the group comprised of S and Se in grain-oriented electrical steel sheet is 0.0005%.

Sol. Al: 0.01% or less

Aluminum (Al) bonds with N in the manufacturing process of the grain-oriented electrical steel sheet to form AlN functioning as an inhibitor. However, if the content of sol. Al in the grain-oriented electrical steel sheet is over 0.01%, the inhibitor excessively remains in the steel sheet, so the magnetic properties fall. Therefore the content of sol. Al is 0.01% or less. The preferable upper limit of the content of sol. Al is 0.004%, more preferably 0.003%. The content of sol. Al is preferably as low as possible. However, even if reducing the content of sol. Al in the grain-oriented electrical steel sheet to less than 0.0001%, the manufacturing costs just build up. The above effect does not change much at all. Therefore, the preferable lower limit of the content of sol. Al in the grain-oriented electrical steel sheet is 0.0001%. Note that, in this Description, sol. Al means "acid soluble Al". Therefore the content of sol. Al is the content of acid soluble Al.

N: 0.01% or less

Nitrogen (N) bonds with Al in the manufacturing process of the grain-oriented electrical steel sheet to form AlN functioning as an inhibitor. However, if the content of N in the grain-oriented electrical steel sheet is over 0.01%, the inhibitor excessively remains in the grain-oriented electrical steel sheet and the magnetic properties fall. Therefore, the content of N is 0.01% or less. The preferable upper limit of the content of N is 0.004%, more preferably 0.003%. The content of N is preferably as low as possible. However, even if reducing the total of the content of N in the grain-oriented electrical steel sheet to less than 0.0001%, the manufacturing costs just build up. The above effect does not change much at all. Therefore, the preferable lower limit of the content of N in the grain-oriented electrical steel sheet is 0.0001%.

The balance of the chemical composition of the base metal steel sheet of the grain-oriented electrical steel sheet according to the present invention is comprised of Fe and impurities. Here, "impurities" mean the following elements which enter from the ore used as the raw material, the scrap, or the manufacturing environment etc. when industrially manufacturing the base metal steel sheet or remain in the steel without being completely removed in the purification annealing and which are allowed to be contained in a content not having a detrimental effect on the action of the grain-oriented electrical steel sheet according to the present invention.

Regarding Impurities

In the impurities in the base metal steel sheet of the grain-oriented electrical steel sheet according to the present invention, the total content of the one or more elements selected from the group comprised of Cu, Sn, and Sb, Bi, Te, and Pb is 0.30% or less.

Regarding copper (Cu), tin (Sn), antimony (Sb), bismuth (Bi), tellurium (Te, and lead (Pb), part of the Cu, Sn, and Sb, Bi, Te, and Pb in the base metal steel sheet is discharged outside of the system by high temperature heat treatment also known as "purification annealing" of one process of the finish annealing. These elements raise the selectivity of orientation of the secondary recrystallization in the finish annealing to exhibit the action of improvement of the magnetic flux density, but if remaining in the base metal steel sheet after completion of the finish annealing, cause the deterioration of the core loss as simple impurities. Therefore, the total content of the one or more elements selected from the group comprised of Cu, Sn, and Sb, Bi, Te, and Pb is 0.30% or less. As explained above these elements are impurities, so the total content of these elements is preferably as low as possible.

Primary Scale

The grain-oriented electrical steel sheet according to the present invention, furthermore, as explained above, is provided with a primary coating. The primary coating is formed on the surface of the base metal steel sheet. The main constituent of the primary coating is $Mg_2SiO_4$ (forsterite). More specifically, the primary coating contains 50 to 90 mass % of $Mg_2SiO_4$.

Note that, the main constituent of the primary coating is, as explained above, $Mg_2SiO_4$, but in the primary coating, at least one or more types of a compound of metal selected from the group comprised of Y, La, and Ce and at least one or more types of a compound of metal selected from the group comprised of Ti, Zr, and Hf are contained. The total content of the Y, La, and Ce in the primary coating is 0.001 to 2.0 by mass %. Further, the total content of the Ti, Zr, and Hf in the primary coating 0.0015 to 6.0 by mass %.

As explained above, in the present invention, in the method for manufacturing grain-oriented electrical steel sheet, an annealing separator containing a compound of metal selected from the group comprised of Y, La, and Ce and a compound of metal selected from the group comprised of Ti, Zr, and Hf explained above is used. Due to this, the magnetic properties of the grain-oriented electrical steel sheet can be raised and the coating adhesion of the primary coating can also be raised. By a compound of metal selected from the group comprised of Y, La, and Ce and a compound of metal selected from the group comprised of Ti, Zr, and Hf being contained in the annealing separator, the primary coating also contains the above-mentioned contents of Y, La, and Ce and Ti, Zr, and Hf The content of $Mg_2 SiO_4$ in the primary coating can be measured by the following method. The grain-oriented electrical steel sheet is electrolyzed to separate the primary coating alone from the surface of the base metal sheet. The Mg in the separated primary coating is quantitatively analyzed by induction coupling plasma mass spectrometry (ICP-MS). The product of the obtained quantized value (mass %) and the molecular weight of $Mg_2 SiO_4$ is divided by the atomic weight of Mg to find the content of $Mg_2 SiO_4$ equivalent.

The total content of Y, La, and Ce and the total content of Ti, Zr, and Hf in the primary coating can be found by the following method. The grain-oriented electrical steel sheet is electrolyzed to separate the primary coating alone from the surface of the base metal sheet. The contents of Y, La, and Ce (mass %) and the contents of Ti, Zr, and Hf (mass %) in the primary coating separated are quantitatively analyzed by ICP-MS.

Peak Position of Al Emission Intensity by GDS

In the grain-oriented electrical steel sheet according to the present invention, furthermore, a peak position of Al emission intensity obtained when performing elemental analysis by glow discharge optical emission spectrometry from a surface of the primary coating in a thickness direction of the grain-oriented electrical steel sheet is arranged within a range of 2.0 to 12.0 µm from the surface of the primary coating in the thickness direction.

In grain-oriented electrical steel sheet, there are anchoring structures at the interface of the primary coating and the steel sheet (base metal). Specifically, parts of the primary coating penetrate to the inside of the steel sheet from the surface of the steel sheet. The parts of the primary coating which penetrate to the inside of the steel sheet from the surface of the steel sheet exhibit a so-called anchoring effect and raise the adhesion of the primary coating with respect to the steel sheet. After this, in this Description, the parts of the primary coating penetrating to the inside of the steel sheet from the surface of the steel sheet will be defined as "roots of the primary coating".

In the regions where the roots of the primary coating penetrate to the inside of the steel sheet, the main constituent of the roots of the primary coating is spinel ($MgAl_2 O_4$)— one type of Al oxide. The peak of the Al emission intensity obtained when performing elemental analysis by glow discharge optical emission spectrometry shows the position where the spinel is present.

The depth position of the peak of Al emission intensity from the surface of the primary coating is defined as the "Al peak position $D_{Al}$" (µm). An Al peak position $D_{Al}$ of less than 2.0 µm means that spinel is formed at a shallow (low) position from the surface of the steel sheet, that is, the roots of the primary coating are shallow. In this case, the adhesion of the primary coating is low. On the other hand, an Al peak position $D_{Al}$ of over 12.0 µm means that the roots of the primary coating have excessively developed. The roots of the primary coating penetrate down to deep parts inside of the steel sheet. In this case, the roots of the primary coating obstruct domain wall movement and the magnetic properties fall.

If the Al peak position $D_{Al}$ is 2.0 to 12.0 µm, excellent magnetic properties can be maintained while the adhesion of the primary coating can be raised. The preferable lower limit of the Al peak position $D_{Al}$ is 3.0 µm, more preferably 4.0 µm. The preferable upper limit of the Al peak position $D_{Al}$ is 11.0 µm, more preferably 10.0 µm.

The Al peak position $D_{Al}$ can be measured by the following method. Known glow discharge optical emission spectrometry (GDS) is used for elemental analysis. Specifically, the space above the surface of the grain-oriented electrical steel sheet is made an Ar atmosphere. Voltage is applied to the grain-oriented electrical steel sheet to cause generation of glow plasma which is used to sputter the surface layer of the steel sheet while analyzing it in the thickness direction.

The Al contained in the surface layer of the steel sheet is identified based on the emission spectrum wavelength distinctive to the element generated by excitation of atoms in the glow plasma. Furthermore, the identified Al emission intensity is plotted in the depth direction. The Al peak position $D_{Al}$ is found based on the plotted Al emission intensity.

The depth position from the surface of the primary coating in the elemental analysis is calculated based on the sputter time. Specifically, in a standard sample, the relationship between the sputter time and the sputter depth (below, referred to as the "sample results") is found in advance. The sample results are used to convert the sputter time to the sputter depth. The converted sputter depth is defined as the depth position found by the elemental analysis (Al analysis) (depth position from surface of primary coating). In the GDS in this disclosure, it is possible to use a commercially available high frequency glow discharge optical emission analysis apparatus.

Number Density ND of Al Oxides of Size of 0.2 µm or More at Discharge Marks

In the grain-oriented electrical steel sheet according to the present invention, further, the number density ND of Al oxides of a size of 0.2 µm or more by circle equivalent diameter based on area at the Al peak position $D_{Al}$ is 0.03 to 0.2/µm$^2$ As explained above, the Al peak position $D_{Al}$ corresponds to the part of the roots of the primary coating. At the roots of the primary coating, there is a large amount of the Al oxide spinel ($MgAl_2 O_4$) present. Therefore, if defining the number density of Al oxides at any region at the Al peak position $D_{Al}$ (for example, the bottom parts of discharge marks of the glow discharge) as the Al oxide number density ND, the Al oxide number density ND becomes an indicator showing the dispersed state of roots of the primary coating (spinel) at the surface layer of the steel sheet.

If the Al oxide number density ND is less than 0.03/µm$^2$, the roots of the primary coating are not sufficiently formed. For this reason, the adhesion of the primary coating with respect to the steel sheet is low. On the other hand, if the Al oxide number density ND is over 0.2/µm$^2$, the roots of the primary coating excessively develop and the roots of the primary coating penetrate down to deep parts inside the steel sheet. In this case, the roots of the primary coating obstruct secondary recrystallization and domain wall movement and the magnetic properties fall. Therefore, the Al oxide number density ND is 0.03 to 0.2/µm$^2$. The preferable lower limit of the Al oxide number density ND is 0.035/µm$^2$, more preferably 0.04/µm$^2$. The preferable upper limit of the number density ND is 0.15/µm$^2$, more preferably 0.1/µm$^2$.

The Al oxide number density ND can be found by the following method: A glow discharge optical emission analysis apparatus is used for glow discharge down to the Al peak position $D_{Al}$. Any 36 μm×50 μm region (observed region) in the discharge marks at the Al peak position $D_{Al}$ is analyzed for elements by an energy dispersive type X-ray spectroscope (EDS) to prepare a map showing the distribution of characteristic X-ray intensity in the observed region and identify the Al oxides. Specifically, a region in which the intensity of the characteristic X-rays of O of 50% or more with respect to the maximum intensity of the characteristic X-rays of O in the observed region is analyzed is identified as an oxide. In the identified oxide regions, a region in which the intensity of the characteristic X-rays of Al of 30% or more with respect to the maximum intensity of the characteristic X-rays of Al is analyzed is identified as an Al oxide. The identified Al oxides are mainly spinel. Among the identified Al oxides, the number of the Al oxides of a size of 0.2 μm or more by circle equivalent diameter based on area are counted and the Al oxide number density ND (/μm$^2$) is found by the following formulas:

Circle equivalent diameter=$\sqrt{(4/\pi \cdot ({\rm area\ of\ regions\ of\ identified\ Al\ oxides\ (area\ per\ analysis\ point\ in\ map\ showing\ distribution\ of\ characteristic\ X\text{-}ray\ intensity} \times {\rm number\ of\ analysis\ points\ corresponding\ to\ regions\ identified\ as\ Al\ oxides}))}$ Area per analysis point in map showing distribution of characteristic X-ray intensity=mapping region area÷number of analysis points ND=Number of identified Al oxides of circle equivalent diameter of 0.2 μm or more/Area of observed region If the total content of Y, La, and Ce in the primary coating is 0.001 to 4.0% and the total content of Ti, Hf, and Zr in the primary coating 0.0005 to 8.0%, the Al peak position $D_{Al}$ becomes 2.0 to 12.0 μm and the number density ND of Al oxides at the Al peak position $D_{Al}$ becomes 0.03 to 0.2/μm$^2$.

Method for Manufacture

One example of the method for manufacturing grain-oriented electrical steel sheet according to the present invention will be explained.

One example of the method for manufacturing grain-oriented electrical steel sheet is provided with a cold rolling process, decarburization annealing process, and finish annealing process. Below, the processes will be explained.

Cold Rolling Process

In the cold rolling process, hot rolled steel sheet is cold rolled to manufacture cold rolled steel sheet. The hot rolled steel sheet has the following chemical composition.

C: 0.1% or less,

If the content of C in the hot rolled steel sheet is over 0.1%, the time required for the decarburization annealing becomes longer. In this case, the manufacturing costs rise and the productivity falls. Therefore, the content of C in the hot rolled steel sheet is 0.1% or less. The preferable upper limit of content of C of the hot rolled steel sheet is 0.092%, more preferably 0.085%. The lower limit of the content of C of the hot rolled steel sheet is 0.005%, the preferable lower limit is 0.02%, and the more preferable lower limit is 0.04%.

Si: 2.5 to 4.5%,

As explained in the section on the chemical composition of the grain-oriented electrical steel sheet of the finished product, Si raises the electrical resistance of steel, but if excessively included, the cold workability falls. If the content of Si of the hot rolled steel sheet is 2.5 to 4.5%, the content of Si of the grain-oriented electrical steel sheet after the finish annealing process becomes 2.5 to 4.5%. The preferable upper limit of the Si content of hot rolled steel sheet is 4.0%, while the more preferable upper limit is 3.8%. The preferable lower limit of the content of Si of the hot rolled steel sheet is 2.6%, while the more preferable lower limit is 2.8%.

Mn: 0.02 to 0.2%

As explained in the section on the chemical composition of the grain-oriented electrical steel sheet of the finished product, in the manufacturing process, Mn bonds with S and Se to form precipitates which function as inhibitors. Mn further raises the hot workability of steel. If the content of Mn of the hot rolled steel sheet is 0.02 to 0.2%, the content of Mn of the grain-oriented electrical steel sheet after the finish annealing process becomes 0.02 to 0.2%. The preferable upper limit of the content of Mn of the hot rolled steel sheet is 0.13%, while the more preferable upper limit is 0.1%. The preferable lower limit of the content of Mn in the hot rolled steel sheet is 0.03%, while the more preferable lower limit is 0.04%.

One or more elements selected from the group comprised of S and Se: total of 0.005 to 0.07%

In the manufacturing process, sulfur (S) and selenium (Se) bond with Mn to form MnS and MnSe. Both MnS and MnSe function as inhibitors required for suppressing crystal grain growth during secondary recrystallization. If the total content of the one or more elements selected from the group comprised of S and Se is less than 0.005%, the above effect is hard to obtain. On the other hand, if the total content of the one or more elements selected from the group comprised of S and Se is over 0.07%, in the manufacturing process, secondary recrystallization does not occur and the magnetic properties of the steel fall. Therefore, in the hot rolled steel sheet, the total content of the one or more elements selected from the group comprised of S and Se is 0.005 to 0.07%. The preferable lower limit of the total content of the one or more elements selected from the group comprised of S and Se is 0.008%, more preferably 0.016%. The preferable upper limit of the total content of the one or more elements selected from the group comprised of S and Se is 0.06%, more preferably 0.05%.

Sol. Al: 0.005 to 0.05%

In the manufacturing process, aluminum (Al) bonds with N to form AlN. AlN functions as an inhibitor. If the content of the sol. Al in the hot rolled steel sheet is less than 0.005%, the above effect is not obtained. On the other hand, if the content of the sol. Al in the hot rolled steel sheet is over 0.05%, the AlN coarsens. In this case, it becomes difficult for the AlN to function as an inhibitor and sometimes secondary recrystallization is not caused. Therefore, the content of the sol. Al in the hot rolled steel sheet is 0.005 to 0.05%. The preferable upper limit of the content of the sol. Al in the hot rolled steel sheet is 0.04%, more preferably 0.035%. The preferable lower limit of the content of the sol. Al in the hot rolled steel sheet is 0.01%, more preferably 0.015%.

N: 0.001 to 0.030%

In the manufacturing process, nitrogen (N) bonds with Al to form AlN functioning as an inhibitor. If the content of N in the hot rolled steel sheet is less than 0.001%, the above effect is not obtained. On the other hand, if the content of N in the hot rolled steel sheet is over 0.030%, the AlN coarsens. In this case, it becomes difficult for the AlN to function as an inhibitor, and sometimes secondary recrystallization is not caused. Therefore, the content of N in the hot rolled steel sheet is 0.001 to 0.030%. The preferable upper limit of the content of N in the hot rolled steel sheet is 0.012%, more preferably 0.010%. The preferable lower limit of the content of N in the hot rolled steel sheet is 0.005%, more preferably 0.006%.

The balance of the chemical composition in the hot rolled steel sheet of the present invention is comprised of Fe and impurities. Here, "impurities" mean elements which enter from the ore used as the raw material, the scrap, or the manufacturing environment etc. when industrially manufacturing the hot rolled steel sheet and which are allowed to be contained in a range not having a detrimental effect on the hot rolled steel sheet of the present embodiment.

Regarding Optional Elements

The hot rolled steel sheet according to the present invention may further contain, in place of part of the Fe, one or more elements selected from the group comprised of Cu, Sn and Sb in a total of 0.6% or less. These elements are all optional elements.

One or more elements selected from the group comprised of Cu, Sn, and Sb: total of 0 to 0.6%

Copper (Cu), tin (Sn), and antimony (Sb) are all optional elements and need not be contained. If included, Cu, Sn, and Sb all raise the magnetic flux density of grain-oriented electrical steel sheet. If Cu, Sn, and Sb are contained even a little, the above effect is obtained to a certain extent. However, if the contents of Cu, Sn, and Sb are over a total of 0.6%, at the time of decarburization annealing, it becomes difficult for an internal oxide layer to be formed. In this case, at the time of the finish annealing, the formation of the primary coating, which proceeds with the reaction of MgO of the annealing separator and the $SiO_2$ of the internal oxide layer, is delayed. As a result, the adhesion of the primary coating formed falls. Further, after purification annealing, Cu, Sn, and Sb easily remain as impurity elements. As a result, the magnetic properties deteriorate. Therefore, the content of one or more elements selected from the group comprised of Cu, Sn, and Sb is a total of 0 to 0.6%. The preferable lower limit of the total content of one or more elements selected from the group comprised of Cu, Sn, and Sb is 0.005%, more preferably 0.007%. The preferable upper limit of the total content of one or more elements selected from the group comprised of Cu, Sn, and Sb is 0.5%, more preferably 0.45%.

The hot rolled steel sheet according to the present invention may further contain, in place of part of the Fe, one or more elements selected from the group comprised of Bi, Te, and Pb in a total of 0.03% or less. These elements are all optional elements.

One or more elements selected from group comprised of Bi, Te, and Pb: total of 0 to 0.03%

Bismuth (Bi), tellurium (Te), and lead (Pb) are all optional elements and need not be contained. If included, Bi, Te, and Pb all raise the magnetic flux density of grain-oriented electrical steel sheet. If these elements are contained even a little, the above effect is obtained to a certain extent. However, if the total content of these elements is over 0.03%, at the time of finish annealing, these elements segregate at the surface and the interface of the primary coating and steel sheet becomes flattened. In this case, the coating adhesion of the primary coating falls. Therefore, the total content of the one or more elements selected from the group comprised of Bi, Te, and Pb is 0 to 0.03%. The preferable lower limit value of the total content of the one or more elements selected from the group comprised of Bi, Te, and Pb is 0.0005%, more preferably 0.001%. The preferable upper limit of the total content of the one or more elements selected from the group comprised of Bi, Te, and Pb is 0.02%, more preferably 0.015%.

The hot rolled steel sheet having the above-mentioned chemical composition is manufactured by a known method. One example of the method of manufacturing the hot rolled steel sheet is as follows. A slab having a chemical composition the same as the above-mentioned hot rolled steel sheet is prepared. The slab is manufactured through a known refining process and casting process. The slab is heated. The heating temperature of the slab is, for example, over 1280° C. to 1350° C. or less. The heated slab is hot rolled to manufacture the hot rolled steel sheet.

The prepared hot rolled steel sheet is cold rolled to produce the cold rolled steel sheet of the base metal steel sheet. The cold rolling may be performed only one time or may be performed several times. If performing cold rolling several times, after performing cold rolling, process annealing is performed for purpose of softening the steel, then cold rolling is performed. By performing cold rolling one time or several times, cold rolled steel sheet having the finished product thickness (thickness of finished product) is manufactured.

The cold rolling rate in the one time or several times of cold rolling is 80% or more. Here, the cold rolling rate (%) is defined as follows:

Cold rolling rate (%)={1−(thickness of cold rolled steel sheet after final cold rolling)/(thickness of hot rolled steel sheet before start of initial cold rolling)}×100

Note that, the preferable upper limit of the cold rolling rate is 95%. Further, before cold rolling the hot rolled steel sheet, the hot rolled steel sheet may be heat treated or may be pickled.

Decarburization Annealing Process

The steel sheet manufactured by the cold rolling process is treated by decarburization annealing and if necessary is treated by nitridation annealing. The decarburization annealing is performed in a known hydrogen-nitrogen-containing wet atmosphere. Due to the decarburization annealing, the C concentration of the grain-oriented electrical steel sheet is reduced to 50 ppm or less able to suppress magnetic aging deterioration. In the decarburization annealing, furthermore, primary recrystallization occurs at the steel sheet and the working strain introduced due to the cold rolling process is relieved. Furthermore, in the decarburization annealing process, an internal oxide layer having $SiO_2$ as its main constituent is formed at the surface layer part of the steel sheet. The annealing temperature in the decarburization annealing is known. For example, it is 750 to 950° C. The holding time at the annealing temperature is, for example, 1 to 5 minutes.

Finish Annealing Process

The steel sheet after the decarburization annealing process is treated by a finish annealing process. In the finish annealing process, first, the surface of the steel sheet is coated with an aqueous slurry containing the annealing separator. The amount of coating is for example one for coating a 1 $m^2$ steel sheet by 4 to 15 $g/m^2$ or so per surface. The steel sheet on which the aqueous slurry was coated is inserted into a 400 to 1000° C. furnace and dried, then annealed (finish annealing).

Regarding Aqueous Slurry

The aqueous slurry is produced by adding industrial use pure water to the annealing separator explained later and stirring them. The ratio of the annealing separator and industrial use pure water may be determined so as to give the required coating amount at the time of coating by a roll coater. For example, it is preferably 2 times or more and 20 times or less. If the ratio of water to the annealing separator is less than 2 times, the viscosity of the aqueous slurry will become too high and the annealing separator cannot be uniformly coated on the surface of the steel sheet, so this is not preferable. If the ratio of the water to the annealing separator is over 20 times, in the succeeding drying process, the aqueous slurry will become insufficiently dried and the water content remaining in the finish annealing will cause additional oxidation of the steel sheet whereby the appearance of the primary coating will deteriorate, so this is not preferable.

Regarding Annealing Separator

In the present invention, the annealing separator used in the finish annealing process contains magnesium oxide (MgO) and additives. MgO is the main constituent of the annealing separator. The "main constituent" means the constituent contained in 50 mass % or more in a certain substance and preferably is 70 mass % or more, more preferably 90 mass % or more. The amount of deposition of the annealing separator on the steel sheet is, per side, for example preferably 2 g/m$^2$ or more and 10 g/m$^2$ or less. If the amount of deposition of the annealing separator on the steel sheet is less than 2 g/m$^2$, in the finish annealing, the steel sheets will end up sticking to each other, so this is not preferable. If the amount of deposition of the annealing separator on the steel sheet is over 10 g/m$^2$, the manufacturing costs increase, so this is not preferable.

The additives include at least one or more types of compounds of metal selected from a group comprised of Y, La, and Ce and at least one or more types of compounds of metal selected from a group comprised of Ti, Zr, and Hf, wherein when a content of the MgO in the annealing separator is defined as 100% by mass %, a total content of the compounds of metal selected from a group comprised of Y, La, and Ce converted to oxides is 0.5 to 8.0% and a total content of the compounds of metal selected from a group comprised of Ti, Zr, and Hf converted to oxides is 0.5 to 10.0%, further, a total of the total content of the compounds of metal selected from a group comprised of Y, La, and Ce converted to oxides and the total content of the compounds of metal selected from a group comprised of Ti, Zr, and Hf converted to oxides is 2.0 to 14.0%, and further a ratio of a sum of the numbers of Ti, Zr, and Hf atoms and a sum of the numbers of Y, La, and Ce atoms contained in the annealing separator is 0.15 to 4.0. Below, the additives in the annealing separator will be explained in detail.

Additives

The additives include at least one or more types of compounds of metal selected from a group comprised of Y, La, and Ce and at least one or more types of compounds of metal selected from a group comprised of Ti, Zr, and Hf. The contents of compounds of metal selected from a group comprised of Y, La, and Ce converted to oxides and contents of compounds of metal selected from a group comprised of Ti, Zr, and Hf converted to oxides are as follows.

Compounds of Metal Selected From Group Comprised of Y, La, and Ce

Compounds of metal selected from the group comprised of Ya, La, and Ce ("Y, La, and Ce compounds") are contained, converted to oxides, in a total of 0.5 to 8.0% when defining the MgO content in the annealing separator as 100% by mass %. Here, a certain single type of Y, Ya, and Ce compound contained in the annealing separator is defined as $M_{RE}$. The content $W_{RE}$ (mass %) of $M_{RE}$ converted to oxides in the annealing separator is as follows.

$W_{RE}$=(amount of addition of $M_{RE}$(mass %))/(molecular weight of $M_{RE}$)×((molecular weight of $Y_2O_3$)×(number of Y atoms per molecule of $M_{RE}$/2)+(molecular weight of $La_2O_3$)×(number of La atoms per molecule of $M_{RE}$/2)+(molecular weight of $CeO_2$)×(number of Ce atoms per molecule of $M_{RE}$))

Further, regarding the $M_{RE}$, the ratio $x_{RE}$ of the sum of the numbers of Y, La, and Ce atoms to the number of Mg atoms contained in the annealing separator is as follows.

$x_{RE}$=((number of atoms of Y per $M_{RE}$ molecule)+(number of atoms of La per $M_{RE}$ molecule)+(number of atoms of Ce per $M_{RE}$ molecule))×(amount of addition of $M_{RE}$ (mass %)/molecular weight of $M_{RE}$)×(molecular weight of MgO/100)

Therefore, the total content $C_{RE}$ of the Y, La, and Ce compounds converted to oxides when defining the MgO content as 100% by mass % in an annealing separator to which one or two or more of Y, La, and Ce compounds have been added (below, referred to as "the content $C_{RE}$ of Y, La, and Ce compounds converted to oxides") and the ratio $X_{RE}$ of the sum of the numbers of Y, La, and Ce atoms with respect to the number of Mg atoms in the annealing separator (below, referred to as "the abundance ratio $X_{RE}$ of Y, La, and Ce atoms") are respectively the sum $W_{RE}$ and sum of $x_{RE}$ of compounds of metal selected from the group comprised of Ya, La, and Ce contained in the annealing separator.

"Y, La, and Ce compounds" are compounds in which one or more of Y, La, and Ce atoms are contained in the compound molecule and for example are oxides and hydroxides, carbonates, sulfates, etc. part or all of which are changed to oxides by later explained drying treatment and finish annealing treatment. The Y, La, and Ce compounds suppress aggregation of the primary coating. The Y, La, and Ce compounds further function as sources of oxygen release. For this reason, growth of the roots of the primary coating formed by the finish annealing is promoted. As a result, the adhesion of the primary coating with respect to the steel sheet rises. If the content $C_{RE}$ of Y, La, and Ce compounds converted to oxides is less than 0.5%, the above effect is not sufficiently obtained. On the other hand, if the content $C_{RE}$ of Y, La, and Ce compounds converted to oxides is over 8.0%, the roots of the primary coating excessively develop. In this case, the roots of the primary coating will obstruct domain wall movement, so the magnetic properties fall. If the content $C_{RE}$ of Y, La, and Ce compounds converted to oxides is over 8.0%, furthermore, the content of MgO in the annealing separator becomes lower, so formation of $Mg_2SiO_4$ is suppressed. That is, the reactivity falls. Therefore, the content $C_{RE}$ of Y, La, and Ce compounds converted to oxides is 0.5 to 8.0%. The preferable lower limit of the content $C_{RE}$ of Y, La, and Ce compounds converted to oxides is 0.8%, more preferably 1.2%. The preferable upper limit of the content $C_{RE}$ of Y, La, and Ce compounds converted to oxides is 7.0%, more preferably 6.5%.

Compounds of Metal Selected From Group Comprised of Ti, Zr, and Hf

Compounds of metal selected from the group comprised of Ti, Zr, and Hf ("Ti, Zr, and Hf compounds") are contained, converted to oxides, in a total of 0.5 to 10.0% when defining the MgO content in the annealing separator as 100% by mass %. Here, a certain single type of Ti, Zr, and Hf compound contained in the annealing separator is defined as $M_{G4}$. The content $W_{G4}$ (mass %) of $M_{G4}$ converted to oxides in the annealing separator is as follows.

$W_{G4}$=(amount of addition of $M_{G4}$ (mass %))/(molecular weight of $M_{G4}$)×((molecular weight of $TiO_2$)×(number of Ti atoms per molecule of $M_{G4}$)+(molecular weight of $ZrO_2$)×(number of Zr atoms per molecule of $M_{G4}$)+(molecular weight of $HfO_2$)×(number of Hf atoms per molecule of $M_{G4}$))

Further, regarding the $M_{G4}$, the ratio $x_{G4}$ of the sum of the numbers of Ti, Zr, and Hf atoms to the number of Mg atoms contained in the annealing separator is as follows.

$x_{G4}$=((number of atoms of Ti per molecule of $M_{G4}$)+(number of atoms of Zr per molecule of $M_{G4}$)+(number of atoms of Hf per molecule of $M_{G4}$))×(amount of addition of $M_{G4}$ (mass %)/molecular weight of $M_{G4}$)× (molecular weight of MgO/100)

Therefore, the total content $C_{G4}$ of the Ti, Zr, and Hf compounds converted to oxides when defining the MgO content as 100% by mass % in an annealing separator to which one or two or more of Ti, Zr, and Hf compounds have been added (below, referred to as "the content $C_{G4}$ of Ti, Zr, and Hf compounds converted to oxides") and the ratio $X_{G4}$ of the sum of the numbers of Ti, Zr, and Hf atoms with respect to the number of Mg atoms in the annealing separator (below, referred to as "the abundance ratio $X_{G4}$ of Ti, Zr, and Hf atoms") are respectively the sum of $W_{G4}$ and sum of $x_{G4}$ of compounds of metal selected from the group comprised of Ti, Zr, and Hf contained in the annealing separator.

"Ti, Zr, and Hf compounds" are compounds in which one or more of Ti, Zr, and Hf atoms are contained in the compound molecule and for example are oxides and hydroxides, phosphates, etc. part or all of which are changed to oxides by later explained drying treatment and finish annealing treatment. The Ti, Zr, and Hf compounds, when included in the annealing separator together with the Y, La, and Ce compounds, react with part of the Y, La, and Ce compounds during the finish annealing to form complex oxides. If complex oxides are formed, compared with when the Y, La, and Ce compounds are contained alone, the oxygen release ability of the annealing separator can be increased. For this reason, by Ti, Zr, and Hf compounds being included instead of Y, La, and Ce compounds, the fall in magnetic properties accompanying inclusion of excessive Y, La, and Ce compounds can be suppressed while promoting growth of the roots of the primary coating and raising the adhesion of the primary coating with respect to the steel sheet. If the content $C_{G4}$ of Ti, Zr, and Hf compounds converted to oxides is less than 0.5%, the above effect cannot be sufficiently obtained. On the other hand, if the content $C_{G4}$ of Ti, Zr, and Hf compounds converted to oxides is over 10.0%, the roots of the primary coating excessively develop and the magnetic properties sometimes fall. If the content $C_{G4}$ of Ti, Zr, and Hf compounds converted to oxides is over 10.0%, furthermore, the content of MgO in the annealing separator becomes lower, so formation of $Mg_2SiO_4$ is suppressed. That is, the reactivity falls. If the content $C_{G4}$ of Ti, Zr, and Hf compounds converted to oxides is 0.5 to 10.0%, the fall in the magnetic properties and the drop in the reactivity can be suppressed while the adhesion of the primary coating to the base metal steel sheet can be raised.

The preferable lower limit of the abundance ratio $X_{G4}$ of Ti, Zr, and Hf atoms is 0.8%, more preferably 1.5%. The preferable upper limit of the abundance ratio $X_{G4}$ of Ti, Zr, and Hf atoms is 8.0%, more preferably 7.5%.

$X_{RE}/X_{G4}$ Ratio in Annealing Separator

The ratio of the sum of the numbers of Ti, Zr, and Hf atoms and the sum of the numbers of Y, La, and Ce atoms contained in the annealing separator (below, referred to as "$X_{RE}/X_{G4}$") is in a range of 0.15 to 4.00. If $X_{RE}/X_{G4}$ is less than 0.15, during the finish annealing, growth of the roots of the primary coating is not promoted. As a result, the adhesion of the primary coating with respect to the steel sheet falls. On the other hand, even if $X_{RE}/X_{G4}$ is over 4.00, the adhesion falls. As a result, the adhesion of the primary coating with respect to the steel sheet falls. If $X_{RE}/X_{G4}$ is 0.15 to 4.00, the adhesion of the primary coating with respect to the steel sheet rises. The preferable lower limit of $X_{RE}/X_{G4}$ is 0.25, more preferably 0.50. The preferable upper limit of $X_{RE}/X_{G4}$ is 3.00, more preferably 2.50.

$N_{RE}$ and $N_{G4}$ in Annealing Separator

The number density $N_{RE}$ of particles of a particle size of 0.1 μm or more of the compounds of metal selected from the group comprised of Y, La, and Ce contained in the annealing separator and the number density $N_{G4}$ of particles of a particle size of 0.1 μm or more of the compounds of metal selected from the group comprised of Ti, Zr, and Hf are respectively 2,000,000,000/g or more. The particle sizes of these metal compounds are found as the spherical equivalent diameter based on volume and are found from the particle size distribution based on the number of particles obtained by measurement of the raw material powder by a laser diffraction type particle size distribution measuring device.

Here, the "particle size distribution based on the number of particles" shows the frequency of existence (%) with respect to the total particles of the particles in different sections after dividing into 30 or more sections by equal widths in the log scale a range of particle sizes having any value in a range of 0.1 to 0.15 μm as a minimum size and any value in 2000 to 4000 μm as a maximum size. Here, the representative particle size D of each section is found as $$D=10^{\wedge}((Log\ D_{MAX}+Log\ D_{MIN})/2)$$

using the upper limit value $D_{MAX}$ [μm] and lower limit value $D_{MIN}$ [μm] of the respective sections.

Furthermore, the weight w [g] of the particles of each section in 100 particles of the raw material powder is found as $$w=f \cdot d \cdot (D^{\wedge}3 \cdot \pi)/6$$

using the frequency of existence "f" with respect to all particles, the representative particle size D [μm], and the specific gravity "d" [g/μm$^3$] of the metal compound.

The sum W [g] of the weights "w" of all sections is the average weight of 100 particles of the raw material powder, so the number of particles "n" [/g] in 1 g of the metal compound powder is found as $$n=100/W.$$

If finding the number density $N_{RE}$ of particles with a particle size of 0.1 μm or more of compounds of metal selected from the group comprised of Y, La, and Ce, the numbers "n" of particles in 1 g of the metal compound powders in the raw material powder are calculated and the contents "c" (%) of the respective metal compounds in the slurry and the sum C (%) of all of the contents "c" are used to find this as:

$$N_{RE}=\Sigma(n \cdot c/C).$$

The number density $N_{G4}$ of particles with a particle size of 0.1 μm or more of compounds of metal selected from the group comprised of Ti, Zr, and Hf is found in a similar way.

If $N_{RE}$ or $N_{G4}$ is less than 2,000,000,000/g, during the finish annealing, the effect of growth of the roots of the primary coating becomes lopsided and regions arise where the growth of the roots is not sufficiently promoted. As a result, the adhesion of the primary coating with respect to the steel sheet is not sufficiently obtained. If $N_{RE}$ and $N_{G4}$ are 2,000,000,000/g or more, the adhesion of the primary coating rises. Y, La, and Ce and Ti, Zr, and Hf etc. emit oxygen during the finish annealing. Y, La, and Ce gently emit oxygen from a low temperature to a high temperature. On the other hand, Ti, Zr, and Hf may conceivably be relatively short in time periods of release of oxygen, but may conceivably promote the release of oxygen of Y, La, and Ce and continue to keep down aggregation of the internal oxide layer required for development of the coating. For this reason, by raising the number densities $N_{RE}$ and $N_{G4}$ to raise the state of dispersion in the separator layer, interaction in release of oxygen may conceivably be effectively obtained. Note that, the particle size is the spherical equivalent diameter based on volume.

Optional Constituents of Annealing Separator

The above annealing separator may further contain, in accordance with need, one or two or more types of compounds of metal selected from the group comprised of Ca, Sr, and Ba ("Ca, Sr, and Ba compounds") in a ratio of the sum of the numbers of Ca, Sr, and Ba atoms with respect to the number of Mg atoms contained in the annealing separator of less than 0.025.

If compounds of metal selected from the group comprised of Ca, Sr, and Ba are contained, the Ca, Sr, and Ba compounds are contained in less than 0.025 by ratio of the sum of the numbers of Ca, Sr, and Ba atoms with respect to the number of Mg atoms contained in the annealing separator. Here, a certain single type of Ca, Sr, or Ba compound in the annealing separator may be defined as $M_{AM}$ and the ratio $x_{AM}$ of the sum of the Ca, Sr, and Ba atoms of $M_{AM}$ with respect to the number of Mg atoms contained in the annealing separator can be found by the following formula:

$$x_{AM} = ((\text{number of Ca atoms per molecule of } M_{AM}) + (\text{number of Sr atoms per molecule of } M_{AM}) + (\text{number of Ba atoms per molecule of } M_{AM})) \times (\text{amount of addition of } M_{AM} \text{ (mass \%)} / \text{molecular weight of } M_{AM}) / (100 / \text{molecular weight of MgO})$$

Therefore, the ratio $x_{AM}$ of the sum of the Ca, Sr, and Ba atoms to the number of Mg atoms contained in the annealing separator in which one or more types of Ca, Sr, and Ba compounds are added (below, referred to as "the abundance ratio $X_{AM}$ of the Ca, Sr, and Ba atoms") is the sum of the $x_{AM}$'s of all of the types of Ca, Sr, and Ba compounds added.

The Ca, Sr, and Ba compounds are for example oxides and hydroxides, sulfates, phosphates, borates, etc. part or all of which are changed to oxides by later explained drying treatment and finish annealing treatment. The Ca, Sr, and Ba compounds lower the reaction temperature between the MgO in the annealing separator and the $SiO_2$ in the steel sheet surface layer in the finish annealing and promote the formation of $Mg_2SiO_4$. If at least one or more of Ca, Sr, and Ba are contained even a little, the above effect is obtained to a certain extent. On the other hand, if the abundance ratio $X_{AM}$ of the Ca, Sr, and Ba atoms is 0.025 or more, the reaction of MgO and $SiO_2$ is conversely delayed and formation of $Mg_2SiO_4$ is suppressed. That is, the reactivity falls. If the abundance ratio $X_{AM}$ of the Ca, Sr, and Ba atoms is less than 0.025, in the finish annealing, formation of $Mg_2SiO_4$ is promoted.

Manufacturing Conditions of Finish Annealing Process

The finish annealing process is for example performed under the following conditions: Drying treatment is performed before the finish annealing. First, the surface of the steel sheet is coated with the aqueous slurry annealing separator. The steel sheet coated on the surface with the annealing separator is loaded into a furnace held at 400 to 1000° C. and held there (drying treatment). Due to this, the annealing separator coated on the surface of the steel sheet is dried. The holding time is for example 10 to 90 seconds.

After the annealing separator is dried, the finish annealing is performed. In the finish annealing, the annealing temperature is made for example 1150 to 1250° C. and the base metal steel sheet (cold rolled steel sheet) is soaked. The soaking time is for example 15 to 30 hours. The internal furnace atmosphere in the finish annealing is a known atmosphere.

In the grain-oriented electrical steel sheet produced by the above manufacturing process, a primary coating containing $Mg_2SiO_4$ as its main constituent is formed. Furthermore, the Al peak position $D_{Al}$ is arranged in the range of 2.0 to 12.0 μm from the surface of the primary coating. Furthermore, the Al oxide number density ND becomes 0.03 to 0.2/μm².

Note that, due to the decarburization annealing process and finish annealing process, the elements of the chemical composition of the hot rolled steel sheet are removed to a certain extent from the steel constituents. The change in composition (and process) in the finish annealing process is sometimes called "purification (annealing)". In addition to the Sn, Sb, Bi, Te, and Pb utilized for control of the crystal orientation, S, Al, N, etc. functioning as inhibitors are greatly removed. For this reason, compared with the chemical composition of the hot rolled steel sheet, the contents of elements in the chemical composition of the base metal steel sheet of the grain-oriented electrical steel sheet become lower as explained above. If using the hot rolled steel sheet of the above-mentioned chemical composition to perform the above method of manufacture, grain-oriented electrical steel sheet having the base metal steel sheet of the above chemical composition can be produced.

Secondary Coating Forming Process

In one example of the method for manufacturing an grain-oriented electrical steel sheet according to the present invention, furthermore, after the finish annealing process, a secondary coating forming process may be undergone. In the secondary coating forming process, the surface of the grain-oriented electrical steel sheet after lowering the temperature in the finish annealing is coated with an insulating coating agent mainly comprised of colloidal silica and a phosphate, then is baked. Due to this, a secondary coating of a high strength insulating coating is formed on the primary coating.

Magnetic Domain Subdivision Treatment Process

The grain-oriented electrical steel sheet according to the present invention may further be subjected to a process for treatment to subdivide the magnetic domains after the finish annealing process or secondary coating forming process. In the magnetic domain subdivision treatment process, the surface of the grain-oriented electrical steel sheet is scanned by a laser beam having a magnetic domain subdivision effect or grooves are formed at the surface. In this case, grain-oriented electrical steel sheet with further excellent magnetic properties can be manufactured.

EXAMPLES

Below, aspects of the present invention will be specifically explained by examples. These examples are illustrations for confirming the effects of the present invention and do not limit the present invention.

Example 1

Manufacture of Grain-Oriented Electrical Steel Sheet

Molten steel having each of the chemical compositions shown in Table 1 was produced by a vacuum melting furnace. The molten steel produced was used to manufacture a slab by continuous casting.

TABLE 1

| Steel type | Chemical composition (units: mass %, balance of Fe and impurities) | | | | | | | | | | | | | |
|---|---|---|---|---|---|---|---|---|---|---|---|---|---|---|
| | C | Si | Mn | S | Se | S + Se | sol. Al | N | Sn | Sb | Bi | Te | Pb |
| A | 0.080 | 3.3 | 0.080 | 0.022 | — | 0.022 | 0.025 | 0.008 | — | — | — | — | — |
| B | 0.080 | 3.5 | 0.077 | — | 0.044 | 0.044 | 0.025 | 0.008 | — | — | — | — | — |
| C | 0.080 | 3.2 | 0.080 | 0.019 | 0.003 | 0.022 | 0.025 | 0.008 | 0.1 | — | — | — | — |
| D | 0.080 | 3.3 | 0.080 | 0.018 | 0.003 | 0.022 | 0.026 | 0.008 | — | 0.08 | — | — | — |
| E | 0.080 | 3.3 | 0.080 | 0.020 | 0.006 | 0.026 | 0.025 | 0.008 | — | — | 0.0017 | — | — |
| F | 0.080 | 3.2 | 0.075 | 0.021 | 0.002 | 0.023 | 0.025 | 0.008 | — | — | — | 0.001 | — |
| G | 0.080 | 3.3 | 0.080 | 0.019 | 0.003 | 0.022 | 0.025 | 0.008 | — | — | — | — | 0.0012 |

The slab was heated at 1350° C. The heated slab was hot rolled to manufacture hot rolled steel sheet having a thickness of 2.3 mm. The chemical composition of the hot rolled steel sheet was the same as the molten steel and was as indicated in Table 1.

The hot rolled steel sheet was treated to anneal it, then the hot rolled steel sheet was pickled. The annealing treatment conditions for the hot rolled steel sheet and the pickling conditions for the hot rolled steel sheet were made the same in each of the numbered tests.

The pickled hot rolled steel sheet was cold rolled to produce cold rolled steel sheet having a thickness of 0.22 mm. In each of the numbered tests, the cold rolling rate was 90.4%.

The cold rolled steel sheet was annealed by primary recrystallization annealing doubling as decarburization annealing. The annealing temperature of the primary recrystallization annealing was, in each of the numbered tests, 900 to 1120° C. The holding time at the annealing temperature was 2 minutes.

The cold rolled steel sheet after the primary recrystallization annealing was coated with an aqueous slurry and made to dry to coat the annealing separator by a ratio of 5 g/m² per surface. Note that, the aqueous slurry was prepared by mixing the annealing separator (raw material powder) and industrial use pure water by a mixing ratio of 1:2. The annealing separator contained MgO and the additives shown in Table 2. Note that, the Y, La, and Ce content $C_{RE}$ in the annealing separator shown in Table 2 means the total content of the Y, La, and Ce compounds converted to oxides when defining the MgO content in the annealing separator as 100% by mass %. In the same way, the abundance ratio $X_{RE}$ of Y, La, and Ce atoms shown in Table 2 means the ratio of the sum of the numbers of Y, La, and Ce atoms to the number of Mg atoms contained in the annealing separator. In the same way, the content $C_{G4}$ of Ti, Zr, and Hf in the annealing separator shown in Table 2 means the total content of Ti, Zr, and Hf converted to oxides when defining the MgO content in the annealing separator as 100% by mass %. In the same way, the abundance ratio $X_{G4}$ of Ti, Zr, and Hf atoms shown in Table 2 means the ratio of the sum of the numbers of Ti, Zr, and Hf atoms to the number of Mg atoms contained in the annealing separator. In the same way, the Y, La, and Ce number density $N_{RE}$ shown in Table 2 means the number density in the raw material powder of particles of a particle size of 0.1 µm or more of a compound of metal selected from the group comprised of Y, La, and Ce in the annealing separator before preparation into the aqueous slurry. In the same way, the Ti, Zr, and Hf number density $N_{G4}$ shown in Table 2 means the number density in the raw material powder of particles of a particle size of 0.1 µm or more of a compound of metal selected from the group comprised of Ti, Zr, and Hf in the annealing separator before preparation into the aqueous slurry. Note that, the particle size is the spherical equivalent diameter based on volume.

TABLE 2

| Test no. | Hot rolled steel sheet steel type | Additives in annealing separator | | | | | | | | | | | |
|---|---|---|---|---|---|---|---|---|---|---|---|---|---|
| | | $Y_2O_3$ content (mass %) | $La_2O_3$ content (mass %) | $CeO_2$ content (mass %) | $TiO_2$ content (mass %) | $ZrO_2$ content (mass %) | $HfO_2$ content (mass %) | Y, La, Ce content $C_{RE}$ (mass %) | Ti, Zr, Hf content $C_{G4}$ (mass %) | Total content $C_{RE}$ + $C_{G4}$ (mass %) | $X_{RE}$/$X_{G4}$ | Y, La, Ce number density $N_{RE}$ (100,000,000/g) | Ti, Zr, Hf number density $N_{RE}$ (100,000,000/g) | Remarks |
| 1 | A | 0.00 | 0.00 | 0.00 | 1.50 | 0.00 | 0.00 | 0.00 | 1.50 | 1.50 | 0.00 | — | 30.8 | Comp. ex. |
| 2 | A | 0.00 | 0.00 | 0.00 | 0.00 | 1.00 | 0.50 | 0.00 | 1.50 | 1.50 | 0.00 | — | 35.5 | Comp. ex. |
| 3 | A | 0.00 | 0.00 | 0.00 | 0.50 | 0.00 | 1.20 | 0.00 | 1.70 | 1.70 | 0.00 | — | 31.8 | Comp. ex. |
| 4 | A | 0.20 | 0.00 | 0.00 | 1.60 | 0.00 | 0.00 | 0.20 | 1.60 | 1.80 | 0.14 | 41.5 | 32.5 | Comp. ex. |
| 5 | A | 0.00 | 0.30 | 0.00 | 0.00 | 1.60 | 0.00 | 0.30 | 1.60 | 1.90 | 0.14 | 63.2 | 35.4 | Comp. ex. |
| 6 | A | 0.15 | 0.00 | 0.05 | 1.00 | 0.00 | 0.50 | 0.20 | 1.50 | 1.70 | 0.11 | 52.1 | 32.6 | Comp. ex. |
| 7 | A | 0.15 | 0.15 | 0.00 | 1.00 | 0.00 | 0.50 | 0.30 | 1.50 | 1.80 | 0.15 | 42.9 | 52.0 | Comp. ex. |
| 8 | A | 0.00 | 0.25 | 0.15 | 0.00 | 0.00 | 1.50 | 0.40 | 1.50 | 1.90 | 0.34 | 125.4 | 32.8 | Comp. ex. |
| 9 | A | 0.60 | 0.00 | 0.00 | 0.00 | 0.00 | 0.00 | 0.60 | 0.00 | 0.60 | — | 166.8 | — | Comp. ex. |
| 10 | A | 0.00 | 0.00 | 0.00 | 0.00 | 2.00 | 2.00 | 0.00 | 4.00 | 4.00 | 0.00 | 194.2 | 62.4 | Comp. ex. |
| 11 | A | 0.40 | 0.00 | 0.00 | 1.80 | 0.00 | 0.00 | 0.40 | 1.80 | 2.20 | 0.16 | 305.4 | 50.4 | Comp. ex. |
| 12 | A | 0.30 | 0.00 | 0.15 | 0.00 | 1.70 | 2.00 | 0.45 | 3.70 | 4.15 | 0.15 | 331.8 | 91.5 | Comp. ex. |
| 13 | A | 0.00 | 0.00 | 0.50 | 1.00 | 0.50 | 0.00 | 0.50 | 1.50 | 2.00 | 0.18 | 309.5 | 50.9 | Inv. ex. |
| 14 | A | 3.60 | 0.00 | 0.00 | 0.00 | 0.00 | 0.20 | 3.60 | 0.20 | 3.80 | 33.54 | 504.2 | 62.4 | Comp. ex. |
| 15 | A | 3.20 | 0.00 | 1.20 | 0.30 | 0.10 | 0.00 | 4.40 | 0.40 | 4.80 | 7.73 | 508.6 | 60.3 | Comp. ex. |
| 16 | A | 0.00 | 0.00 | 0.00 | 4.00 | 0.00 | 0.00 | 0.00 | 4.00 | 4.00 | 0.00 | — | 184.5 | Comp. ex. |
| 17 | A | 0.00 | 0.33 | 0.00 | 0.00 | 4.00 | 0.00 | 0.33 | 4.00 | 4.33 | 0.06 | 708.4 | 193.5 | Comp. ex. |
| 18 | A | 3.00 | 0.00 | 0.00 | 0.60 | 0.00 | 0.00 | 3.00 | 0.60 | 3.60 | 3.54 | 1065.5 | 192.5 | Inv. ex. |
| 19 | B | 0.00 | 2.00 | 0.00 | 6.00 | 0.00 | 0.00 | 1.80 | 6.00 | 7.80 | 0.16 | 2042.5 | 184.5 | Inv. ex. |

TABLE 2-continued

| | | Additives in annealing separator | | | | | | | | | | | | |
|---|---|---|---|---|---|---|---|---|---|---|---|---|---|---|
| Test no. | Hot rolled steel sheet steel type | $Y_2O_3$ content (mass %) | $La_2O_3$ content (mass %) | $CeO_2$ content (mass %) | $TiO_2$ content (mass %) | $ZrO_2$ content (mass %) | $HfO_2$ content (mass %) | Y, La, Ce content $C_{RE}$ (mass %) | Ti, Zr, Hf content $C_{G4}$ (mass %) | Total content $C_{RE} + C_{G4}$ (mass %) | $X_{RE}/X_{G4}$ | Y, La, Ce number density $N_{RE}$ (100,000,000/g) | Ti, Zr, Hf number density $N_{RE}$ (100,000,000/g) | Remarks |
| 20 | B | 0.00 | 4.00 | 0.00 | 0.00 | 0.00 | 0.00 | 4.00 | 0.00 | 4.00 | — | 2049.5 | — | Comp. ex. |
| 21 | B | 0.00 | 0.00 | 0.00 | 6.00 | 3.00 | 0.00 | 0.00 | 9.00 | 9.00 | 0.00 | 4066.5 | 305.4 | Comp. ex. |
| 22 | B | 1.20 | 1.20 | 0.00 | 11.00 | 0.00 | 0.00 | 2.40 | 11.00 | 13.40 | 0.13 | 4025.5 | 405.3 | Comp. ex. |
| 23 | B | 0.50 | 0.30 | 1.00 | 0.00 | 11.00 | 1.00 | 1.80 | 12.00 | 13.80 | 0.13 | 3099.8 | 606.2 | Comp. ex. |
| 24 | B | 0.00 | 0.00 | 6.00 | 0.80 | 0.00 | 0.00 | 6.00 | 0.80 | 6.80 | 3.48 | 1088.6 | 801.5 | Inv. ex. |
| 25 | B | 6.20 | 0.00 | 0.00 | 0.00 | 0.00 | 2.80 | 6.20 | 2.80 | 9.00 | 4.13 | 2088.4 | 1624.2 | Comp. ex. |
| 26 | B | 0.00 | 0.00 | 7.50 | 0.70 | 0.00 | 0.00 | 7.50 | 0.70 | 8.20 | 4.97 | 2099.5 | 1929.5 | Comp. ex. |
| 27 | B | 0.00 | 0.00 | 7.00 | 0.00 | 1.20 | 0.00 | 7.00 | 1.20 | 8.20 | 4.18 | 3085.6 | 1355.5 | Comp. ex. |
| 28 | B | 0.00 | 0.00 | 6.00 | 0.00 | 0.00 | 0.00 | 6.00 | 0.00 | 6.00 | — | 3045.2 | — | Comp. ex. |
| 29 | B | 3.00 | 3.00 | 0.00 | 4.00 | 0.00 | 2.00 | 6.00 | 6.00 | 12.00 | 0.76 | 5044.2 | 317.6 | Inv. ex. |
| 30 | B | 0.00 | 3.00 | 3.00 | 2.00 | 0.00 | 5.00 | 6.00 | 7.00 | 13.00 | 0.73 | 7088.4 | 391.0 | Inv. ex. |
| 31 | B | 5.00 | 0.00 | 5.00 | 3.00 | 3.00 | 0.00 | 10.00 | 6.00 | 16.00 | 1.18 | 68.5 | 405.5 | Comp. Ex. |
| 32 | B | 0.00 | 0.00 | 9.00 | 2.00 | 2.00 | 0.00 | 9.00 | 4.00 | 13.00 | 1.27 | 67.2 | 55.5 | Comp. Ex. |
| 33 | B | 0.00 | 3.20 | 0.00 | 2.00 | 3.00 | 5.50 | 3.20 | 10.50 | 13.70 | 0.26 | 55.4 | 103.5 | Comp. Ex. |
| 34 | B | 1.20 | 0.00 | 0.00 | 0.30 | 0.00 | 0.00 | 1.20 | 0.30 | 1.50 | 2.83 | 59.0 | 219.6 | Comp. Ex. |
| 35 | B | 0.70 | 0.00 | 0.00 | 4.20 | 0.00 | 0.00 | 0.70 | 4.20 | 4.90 | 0.12 | 60.2 | 405.5 | Comp. Ex. |
| 36 | B | 0.60 | 0.00 | 0.00 | 0.00 | 0.00 | 8.00 | 0.60 | 8.00 | 8.60 | 0.14 | 61.8 | 992.5 | Comp. Ex. |
| 37 | B | 0.00 | 0.00 | 2.00 | 6.50 | 0.00 | 0.00 | 2.00 | 6.50 | 8.50 | 0.14 | 63.2 | 1084.2 | Comp. ex. |
| 38 | B | 0.00 | 0.00 | 0.80 | 0.50 | 3.50 | 0.00 | 0.80 | 4.00 | 4.80 | 0.13 | 68.8 | 516.6 | Comp. ex. |
| 39 | B | 0.00 | 0.20 | 0.30 | 0.00 | 2.00 | 2.00 | 0.50 | 4.00 | 4.50 | 0.12 | 276.3 | 53.5 | Comp. ex. |
| 40 | B | 0.00 | 0.80 | 0.00 | 0.00 | 0.80 | 0.00 | 0.80 | 0.80 | 1.60 | 0.76 | 594.3 | 94.5 | Comp. ex. |
| 41 | B | 0.00 | 7.00 | 0.00 | 4.00 | 0.00 | 4.00 | 7.00 | 8.00 | 15.00 | 0.62 | 913.5 | 21.5 | Comp ex. |
| 42 | B | 0.75 | 0.00 | 0.00 | 0.00 | 0.00 | 7.80 | 0.75 | 7.80 | 8.55 | 0.18 | 55.4 | 305.4 | Inv. ex. |
| 43 | B | 0.00 | 0.00 | 3.50 | 9.80 | 0.00 | 0.00 | 3.50 | 9.80 | 13.30 | 0.17 | 102.5 | 40.6 | Inv. ex. |
| 44 | B | 0.00 | 0.00 | 7.80 | 1.00 | 0.00 | 0.00 | 7.80 | 1.00 | 8.80 | 3.62 | 88.4 | 90.8 | Inv. ex. |
| 45 | C | 3.20 | 0.00 | 0.00 | 0.50 | 2.00 | 0.00 | 3.20 | 2.50 | 5.70 | 1.26 | 203.5 | 21.5 | Inv. ex. |
| 46 | D | 0.00 | 3.00 | 0.00 | 0.00 | 2.00 | 1.00 | 3.00 | 3.00 | 6.00 | 0.88 | 2044.5 | 1657.5 | Inv. ex. |
| 47 | E | 0.00 | 0.00 | 4.00 | 2.00 | 0.00 | 3.00 | 4.00 | 5.00 | 9.00 | 0.59 | 20.9 | 21.5 | Inv. ex. |
| 48 | F | 1.50 | 0.00 | 1.50 | 1.50 | 0.00 | 2.00 | 3.00 | 3.50 | 6.50 | 0.78 | 201.9 | 30.8 | Inv. ex. |
| 49 | G | 0.00 | 1.50 | 3.00 | 2.80 | 3.00 | 0.00 | 4.50 | 5.80 | 10.30 | 0.45 | 4052.1 | 40.8 | Inv. ex. |
| 50 | A | 2.50 | 0.00 | 0.00 | 0.00 | 1.50 | 0.00 | 2.50 | 1.50 | 4.00 | 0.38 | 19.0 | 62.6 | Comp. ex. |
| 51 | B | 1.20 | 0.00 | 1.20 | 0.00 | 1.80 | 0.00 | 2.40 | 1.80 | 4.20 | 0.81 | 18.4 | 71.6 | Comp. ex. |
| 52 | A | 0.00 | 2.00 | 0.00 | 1.20 | 0.00 | 1.80 | 2.00 | 3.00 | 5.00 | 0.24 | 17.3 | 79.6 | Comp. ex. |
| 53 | B | 1.50 | 0.00 | 1.40 | 1.80 | 1.20 | 0.00 | 2.90 | 3.00 | 5.90 | 0.93 | 16.8 | 54.9 | Comp. ex. |
| 54 | A | 0.00 | 4.20 | 0.00 | 5.00 | 0.00 | 0.00 | 4.20 | 5.00 | 9.20 | 0.72 | 66.8 | 17.5 | Comp. ex. |
| 55 | B | 0.00 | 1.50 | 1.90 | 0.00 | 0.00 | 4.50 | 3.40 | 4.50 | 7.90 | 0.20 | 302.4 | 16.2 | Comp. ex. |
| 56 | A | 1.80 | 0.00 | 0.00 | 1.80 | 3.20 | 0.00 | 1.80 | 5.00 | 6.80 | 0.82 | 4006.5 | 5.8 | Comp. ex. |
| 57 | B | 0.00 | 1.80 | 1.20 | 0.00 | 1.50 | 1.40 | 3.00 | 2.90 | 5.90 | 0.42 | 9811.5 | 12.5 | Comp. ex. |

The cold rolled steel sheet on the surface of which the aqueous slurry was coated was, in each of the numbered tests, loaded into a 900° C. furnace for 10 seconds to dry the aqueous slurry. After drying, it was treated by finish annealing. In the finish annealing treatment, in each of the numbered tests, the sheet was held at 1200° C. for 20 hours. Due to the above manufacturing process, grain-oriented electrical steel sheet having a base metal steel sheet and a primary coating was manufactured.

Measurement of Number Density of Particles in Raw Material Powder

The raw material powder was measured for particle size distribution data based on numbers by a laser diffraction particle size distribution measuring device (Model: SALD-3000, Shimadzu Corporation). The number of particles in 1 g was calculated.

Analysis of Chemical Composition of Base Metal Steel Sheet of Grain-Oriented Electrical Steel Sheet The base metal steel sheets of the grain-oriented electrical steel sheets of Test Nos. 1 to 57 manufactured were cleaned by alkali and lightly pickled to remove the primary coating and surface-most layer of the steel sheet, then examined by spark discharge optical emission spectrometry and atomic absorption spectrometry to find the chemical compositions. The found chemical compositions are shown in Table 3.

TABLE 3

| | Chemical composition (unit: mass %, balance of Fe and impurities) | | | | | | | | | | | | |
|---|---|---|---|---|---|---|---|---|---|---|---|---|---|
| Test no. | C | Si | Mn | S | Se | S + Se | sol. Al | N | Sn | Sb | Bi | Te | Pb |
| 1 | 0.0005 | 3.3 | 0.077 | 0.001 | <0.0005 | <0.0015 | 0.002 | 0.002 | <0.0005 | <0.0005 | <0.0005 | <0.0005 | <0.0005 |
| 2 | 0.0005 | 3.3 | 0.078 | 0.001 | <0.0005 | <0.0015 | 0.001 | 0.001 | <0.0005 | <0.0005 | <0.0005 | <0.0005 | <0.0005 |
| 3 | 0.0005 | 3.3 | 0.077 | 0.001 | <0.0005 | <0.0015 | 0.002 | 0.002 | <0.0005 | <0.0005 | <0.0005 | <0.0005 | <0.0005 |
| 4 | 0.0005 | 3.2 | 0.079 | 0.001 | <0.0005 | <0.0015 | 0.001 | 0.003 | <0.0005 | <0.0005 | <0.0005 | <0.0005 | <0.0005 |
| 5 | 0.0005 | 3.3 | 0.077 | 0.001 | <0.0005 | <0.0015 | 0.001 | 0.002 | <0.0005 | <0.0005 | <0.0005 | <0.0005 | <0.0005 |
| 6 | 0.0005 | 3.3 | 0.078 | 0.001 | <0.0005 | <0.0015 | 0.001 | 0.001 | <0.0005 | <0.0005 | <0.0005 | <0.0005 | <0.0005 |
| 7 | 0.0005 | 3.3 | 0.078 | 0.001 | <0.0005 | <0.0015 | 0.002 | 0.001 | <0.0005 | <0.0005 | <0.0005 | <0.0005 | <0.0005 |

TABLE 3-continued

| | Chemical composition (unit: mass %, balance of Fe and impurities) | | | | | | | | | | | | |
|---|---|---|---|---|---|---|---|---|---|---|---|---|---|
| Test no. | C | Si | Mn | S | Se | S + Se | sol. Al | N | Sn | Sb | Bi | Te | Pb |
| 8 | 0.0005 | 3.2 | 0.076 | 0.001 | <0.0005 | <0.0015 | 0.001 | 0.002 | <0.0005 | <0.0005 | <0.0005 | <0.0005 | <0.0005 |
| 9 | 0.0005 | 3.2 | 0.077 | 0.001 | <0.0005 | <0.0015 | 0.002 | 0.001 | <0.0005 | <0.0005 | <0.0005 | <0.0005 | <0.0005 |
| 10 | 0.0005 | 3.2 | 0.076 | 0.001 | <0.0005 | <0.0015 | 0.003 | 0.001 | <0.0005 | <0.0005 | <0.0005 | <0.0005 | <0.0005 |
| 11 | 0.0005 | 3.3 | 0.077 | 0.001 | <0.0005 | <0.0015 | 0.002 | 0.001 | <0.0005 | <0.0005 | <0.0005 | <0.0005 | <0.0005 |
| 12 | 0.0005 | 3.3 | 0.077 | 0.001 | <0.0005 | <0.0015 | 0.002 | 0.001 | <0.0005 | <0.0005 | <0.0005 | <0.0005 | <0.0005 |
| 13 | 0.0005 | 3.2 | 0.077 | 0.001 | <0.0005 | <0.0015 | 0.003 | 0.001 | <0.0005 | <0.0005 | <0.0005 | <0.0005 | <0.0005 |
| 14 | 0.0005 | 3.3 | 0.08 | 0.001 | <0.0005 | <0.0015 | 0.002 | 0.001 | <0.0005 | <0.0005 | <0.0005 | <0.0005 | <0.0005 |
| 15 | 0.0005 | 3.3 | 0.077 | 0.001 | <0.0005 | <0.0015 | 0.002 | 0.002 | <0.0005 | <0.0005 | <0.0005 | <0.0005 | <0.0005 |
| 16 | 0.0005 | 3.3 | 0.076 | 0.001 | <0.0005 | <0.0015 | 0.002 | 0.002 | <0.0005 | <0.0005 | <0.0005 | <0.0005 | <0.0005 |
| 17 | 0.0005 | 3.2 | 0.079 | 0.001 | <0.0005 | <0.0015 | 0.003 | 0.002 | <0.0005 | <0.0005 | <0.0005 | <0.0005 | <0.0005 |
| 18 | 0.0005 | 3.3 | 0.077 | 0.001 | <0.0005 | <0.0015 | 0.002 | 0.001 | <0.0005 | <0.0005 | <0.0005 | <0.0005 | <0.0005 |
| 19 | 0.0005 | 3.4 | 0.079 | 0.001 | <0.0005 | <0.0015 | 0.003 | 0.001 | <0.0005 | <0.0005 | <0.0005 | <0.0005 | <0.0005 |
| 20 | 0.0005 | 3.5 | 0.080 | 0.001 | <0.0005 | <0.0015 | 0.002 | 0.002 | <0.0005 | <0.0005 | <0.0005 | <0.0005 | <0.0005 |
| 21 | 0.0005 | 3.5 | 0.079 | 0.001 | <0.0005 | <0.0015 | 0.002 | 0.001 | <0.0005 | <0.0005 | <0.0005 | <0.0005 | <0.0005 |
| 22 | 0.0005 | 3.4 | 0.077 | <0.0005 | 0.001 | <0.0015 | 0.003 | 0.002 | <0.0005 | <0.0005 | <0.0005 | <0.0005 | <0.0005 |
| 23 | 0.0005 | 3.5 | 0.077 | <0.0005 | 0.001 | <0.0015 | 0.003 | 0.001 | <0.0005 | <0.0005 | <0.0005 | <0.0005 | <0.0005 |
| 24 | 0.0005 | 3.4 | 0.074 | <0.0005 | 0.001 | <0.0015 | 0.002 | 0.002 | <0.0005 | <0.0005 | <0.0005 | <0.0005 | <0.0005 |
| 25 | 0.0005 | 3.4 | 0.074 | <0.0005 | 0.001 | <0.0015 | 0.002 | 0.003 | <0.0005 | <0.0005 | <0.0005 | <0.0005 | <0.0005 |
| 26 | 0.0005 | 3.4 | 0.075 | <0.0005 | 0.001 | <0.0015 | 0.003 | 0.003 | <0.0005 | <0.0005 | <0.0005 | <0.0005 | <0.0005 |
| 27 | 0.0005 | 3.3 | 0.077 | <0.0005 | 0.001 | <0.0015 | 0.003 | 0.001 | <0.0005 | <0.0005 | <0.0005 | <0.0005 | <0.0005 |
| 28 | 0.0005 | 3.4 | 0.075 | <0.0005 | 0.001 | <0.0015 | 0.002 | 0.002 | <0.0005 | <0.0005 | <0.0005 | <0.0005 | <0.0005 |
| 29 | 0.0005 | 3.4 | 0.075 | <0.0005 | 0.001 | <0.0015 | 0.002 | 0.002 | <0.0005 | <0.0005 | <0.0005 | <0.0005 | <0.0005 |
| 30 | 0.0005 | 3.5 | 0.077 | <0.0005 | 0.001 | <0.0015 | 0.002 | 0.003 | <0.0005 | <0.0005 | <0.0005 | <0.0005 | <0.0005 |
| 31 | 0.0005 | 3.5 | 0.075 | <0.0005 | 0.001 | <0.0015 | 0.003 | 0.001 | <0.0005 | <0.0005 | <0.0005 | <0.0005 | <0.0005 |
| 32 | 0.0005 | 3.4 | 0.076 | <0.0005 | 0.001 | <0.0015 | 0.002 | 0.001 | <0.0005 | <0.0005 | <0.0005 | <0.0005 | <0.0005 |
| 33 | 0.0005 | 3.4 | 0.074 | <0.0005 | 0.001 | <0.0015 | 0.003 | 0.002 | <0.0005 | <0.0005 | <0.0005 | <0.0005 | <0.0005 |
| 34 | 0.0005 | 3.4 | 0.073 | <0.0005 | 0.001 | <0.0015 | 0.003 | 0.001 | <0.0005 | <0.0005 | <0.0005 | <0.0005 | <0.0005 |
| 35 | 0.0005 | 3.4 | 0.077 | <0.0005 | 0.001 | <0.0015 | 0.003 | 0.001 | <0.0005 | <0.0005 | <0.0005 | <0.0005 | <0.0005 |
| 36 | 0.0005 | 3.4 | 0.075 | <0.0005 | 0.001 | <0.0015 | 0.002 | 0.001 | <0.0005 | <0.0005 | <0.0005 | <0.0005 | <0.0005 |
| 37 | 0.0005 | 3.5 | 0.075 | <0.0005 | 0.001 | <0.0015 | 0.003 | 0.002 | <0.0005 | <0.0005 | <0.0005 | <0.0005 | <0.0005 |
| 38 | 0.0005 | 3.5 | 0.078 | <0.0005 | 0.001 | <0.0015 | 0.002 | 0.001 | <0.0005 | <0.0005 | <0.0005 | <0.0005 | <0.0005 |
| 39 | 0.0005 | 3.3 | 0.077 | <0.0005 | 0.001 | <0.0015 | 0.002 | 0.002 | <0.0005 | <0.0005 | <0.0005 | <0.0005 | <0.0005 |
| 40 | 0.0005 | 3.4 | 0.076 | <0.0005 | 0.001 | <0.0015 | 0.002 | 0.002 | <0.0005 | <0.0005 | <0.0005 | <0.0005 | <0.0005 |
| 41 | 0.0005 | 3.4 | 0.075 | <0.0005 | 0.001 | <0.0015 | 0.002 | 0.002 | <0.0005 | <0.0005 | <0.0005 | <0.0005 | <0.0005 |
| 42 | 0.0005 | 3.4 | 0.077 | <0.0005 | 0.001 | <0.0015 | 0.003 | 0.001 | <0.0005 | <0.0005 | <0.0005 | <0.0005 | <0.0005 |
| 43 | 0.0005 | 3.5 | 0.075 | <0.0005 | 0.001 | <0.0015 | 0.002 | 0.002 | <0.0005 | <0.0005 | <0.0005 | <0.0005 | <0.0005 |
| 44 | 0.0005 | 3.3 | 0.077 | <0.0005 | 0.001 | <0.0015 | 0.003 | 0.001 | <0.0005 | <0.0005 | <0.0005 | <0.0005 | <0.0005 |
| 45 | 0.0005 | 3.2 | 0.077 | 0.001 | 0.001 | 0.002 | 0.002 | 0.002 | 0.0200 | <0.0005 | <0.0005 | <0.0005 | <0.0005 |
| 46 | 0.0005 | 3.3 | 0.080 | 0.001 | 0.001 | 0.002 | 0.002 | 0.001 | <0.0005 | 0.0010 | <0.0005 | <0.0005 | <0.0005 |
| 47 | 0.0005 | 3.3 | 0.076 | 0.001 | 0.001 | 0.002 | 0.003 | 0.002 | <0.0005 | <0.0005 | 0.0008 | <0.0005 | <0.0005 |
| 48 | 0.0005 | 3.2 | 0.072 | 0.001 | 0.001 | 0.002 | 0.002 | 0.002 | <0.0005 | <0.0005 | <0.0005 | 0.0005 | <0.0005 |
| 49 | 0.0005 | 3.3 | 0.080 | 0.001 | 0.001 | 0.002 | 0.002 | 0.002 | <0.0005 | <0.0005 | <0.0005 | <0.0005 | 0.0005 |
| 50 | 0.0005 | 3.5 | 0.079 | 0.001 | <0.0005 | <0.0015 | 0.002 | 0.001 | <0.0005 | <0.0005 | <0.0005 | <0.0005 | <0.0005 |
| 51 | 0.0005 | 3.4 | 0.077 | <0.0005 | 0.001 | <0.0015 | 0.002 | 0.002 | <0.0005 | <0.0005 | <0.0005 | <0.0005 | <0.0005 |
| 52 | 0.0005 | 3.3 | 0.079 | 0.001 | <0.0005 | <0.0015 | 0.002 | 0.002 | <0.0005 | <0.0005 | <0.0005 | <0.0005 | <0.0005 |
| 53 | 0.0005 | 3.4 | 0.077 | <0.0005 | 0.001 | <0.0015 | 0.003 | 0.002 | <0.0005 | <0.0005 | <0.0005 | <0.0005 | <0.0005 |
| 54 | 0.0005 | 3.3 | 0.079 | 0.001 | <0.0005 | <0.0015 | 0.003 | 0.001 | <0.0005 | <0.0005 | <0.0005 | <0.0005 | <0.0005 |
| 55 | 0.0005 | 3.4 | 0.077 | <0.0005 | 0.001 | <0.0015 | 0.003 | 0.002 | <0.0005 | <0.0005 | <0.0005 | <0.0005 | <0.0005 |
| 56 | 0.0005 | 3.5 | 0.079 | 0.001 | <0.0005 | <0.0015 | 0.002 | 0.001 | <0.0005 | <0.0005 | <0.0005 | <0.0005 | <0.0005 |
| 57 | 0.0005 | 3.3 | 0.077 | <0.0005 | 0.001 | <0.0015 | 0.003 | 0.002 | <0.0005 | <0.0005 | <0.0005 | <0.0005 | <0.0005 |

Evaluation Tests

Al Peak Position $D_{Al}$ Measurement Test

For each of the grain-oriented electrical steel sheet of the numbered tests, the following measurement method was used to find the Al peak position $D_{Al}$. Specifically, the surface layer of the grain-oriented electrical steel sheet was examined by elemental analysis using the GDS method. The elemental analysis was conducted in a range of 100 μm in the depth direction from the surface of the grain-oriented electrical steel sheet (in the surface layer). The Al contained at different depth positions in the surface layer was identified. The emission intensity of the identified Al was plotted in the depth direction from the surface. Based on the graph of the Al emission intensity plotted, the Al peak position $D_{Al}$ was found. The found Al peak position $D_{Al}$ is shown in Table 4.

TABLE 4

| | Additives in annealing separator | | | | Y, La, Ce number density $N_{RE}$ | Ti, Zr, Hf number density $N_{RE}$ | | | Primary coating | | Evaluation test | | |
| --- | --- | --- | --- | --- | --- | --- | --- | --- | --- | --- | --- | --- | --- |
| Test no. | Y, La, Ce content $C_{RE}$ (mass %) | Ti, Zr, Hf content $C_{G4}$ (mass %) | Total content $C_{RE} + C_{G4}$ (mass %) | $X_{RE}/X_{G4}$ | (100,000,000/g) | (100,000,000/g) | $D_{Al}$ (µm) | ND (/µm²) | Y, La, Ce content (%) | Ti, Zr, Hf content (%) | Magnetism | Adhesion | Remarks |
| 1 | 0.00 | 1.50 | 1.5000 | 0.00 | — | 30.8 | 1.4 | 0.021 | 0.000 | 0.066 | Good | Poor | Comp. ex. |
| 2 | 0.00 | 1.50 | 1.5000 | 0.00 | — | 35.5 | 1.5 | 0.022 | 0.000 | 0.057 | Good | Poor | Comp. ex. |
| 3 | 0.00 | 1.70 | 1.7000 | 0.00 | — | 31.8 | 1.4 | 0.024 | 0.000 | 0.054 | Good | Poor | Comp. ex. |
| 4 | 0.20 | 1.60 | 1.8000 | 0.14 | 41.5 | 32.5 | 1.8 | 0.026 | 0.013 | 0.045 | Good | Poor | Comp. ex. |
| 5 | 0.30 | 1.60 | 1.9000 | 0.14 | 63.2 | 35.4 | 1.7 | 0.022 | 0.013 | 0.022 | Good | Poor | Comp. ex. |
| 6 | 0.20 | 1.50 | 1.7000 | 0.11 | 52.1 | 32.6 | 1.7 | 0.024 | 0.020 | 0.054 | Good | Poor | Comp. ex. |
| 7 | 0.30 | 1.50 | 1.8000 | 0.15 | 42.9 | 52.0 | 1.5 | 0.025 | 0.037 | 0.037 | Good | Poor | Comp. ex. |
| 8 | 0.40 | 1.50 | 1.9000 | 0.34 | 125.4 | 32.8 | 1.4 | 0.026 | 0.015 | 0.038 | Good | Poor | Comp. ex. |
| 9 | 0.60 | 0.00 | 0.6000 | — | 166.8 | — | 1.6 | 0.022 | 0.033 | 0.000 | Good | Poor | Comp. ex. |
| 10 | 0.00 | 4.00 | 4.0000 | 0.00 | 194.2 | 62.4 | 1.3 | 0.019 | 0.000 | 0.080 | Good | Poor | Comp. ex. |
| 11 | 0.40 | 1.80 | 2.2000 | 0.16 | 305.4 | 50.4 | 1.8 | 0.031 | 0.023 | 0.042 | Good | Fair | Comp. ex. |
| 12 | 0.45 | 3.70 | 4.1500 | 0.15 | 331.8 | 91.5 | 1.9 | 0.034 | 0.022 | 0.088 | Good | Fair | Comp. ex. |
| 13 | 0.50 | 1.50 | 2.0000 | 0.18 | 309.5 | 50.9 | 2.4 | 0.036 | 0.043 | 0.038 | Good | Good | Inv. ex. |
| 14 | 3.60 | 0.20 | 3.8000 | 33.54 | 504.2 | 62.4 | 2.1 | 0.017 | 0.158 | 0.005 | Good | Fair | Comp. ex. |
| 15 | 4.40 | 0.40 | 4.8000 | 7.73 | 508.6 | 60.3 | 2.5 | 0.022 | 0.221 | 0.009 | Good | Fair | Comp. ex. |
| 16 | 0.00 | 4.00 | 4.0000 | 0.00 | — | 184.5 | 1.3 | 0.028 | 0.000 | 0.111 | Good | Poor | Comp. ex. |
| 17 | 0.33 | 4.00 | 4.3300 | 0.06 | 708.4 | 193.5 | 1.9 | 0.022 | 0.035 | 0.102 | Good | Poor | Comp. ex. |
| 18 | 3.00 | 0.60 | 3.6000 | 3.54 | 1065.5 | 192.5 | 4.2 | 0.051 | 0.158 | 0.033 | Good | Good | Inv. ex. |
| 19 | 1.80 | 6.00 | 7.8000 | 0.16 | 2042.5 | 184.5 | 3.3 | 0.034 | 0.171 | 0.137 | Good | Good | Inv. ex. |
| 20 | 4.00 | 0.00 | 4.0000 | — | 2049.5 | — | 5.6 | 0.028 | 0.203 | 0.000 | Fair | Fair | Comp. ex. |
| 21 | 0.00 | 9.00 | 9.0000 | 0.00 | 4066.5 | 305.4 | 1.2 | 0.027 | 0.000 | 0.199 | Good | Poor | Comp. ex. |
| 22 | 2.40 | 11.00 | 13.4000 | 0.13 | 4025.5 | 405.3 | 1.9 | 0.054 | 0.089 | 0.315 | Good | Fair | Comp. ex. |
| 23 | 1.80 | 12.00 | 13.8000 | 0.13 | 3099.8 | 606.2 | 1.9 | 0.054 | 0.089 | 0.311 | Good | Fair | Comp. ex. |
| 24 | 6.00 | 0.80 | 6.8000 | 3.48 | 1088.6 | 801.5 | 4.3 | 0.088 | 0.229 | 0.033 | Good | Good | Inv. ex. |
| 25 | 6.20 | 2.80 | 9.0000 | 4.13 | 2088.4 | 1624.2 | 6 | 0.025 | 0.322 | 0.088 | Good | Fair | Comp. ex. |
| 26 | 7.50 | 0.70 | 8.2000 | 4.97 | 2099.5 | 1929.5 | 6.8 | 0.028 | 0.517 | 0.028 | Good | Fair | Comp. ex. |
| 27 | 7.00 | 1.20 | 8.2000 | 4.18 | 3085.6 | 1355.5 | 3.5 | 0.022 | 0.515 | 0.027 | Good | Fair | Comp. ex. |
| 28 | 6.00 | 0.00 | 6.0000 | — | 3045.2 | — | 7.2 | 0.006 | 0.330 | 0.000 | Good | Fair | Comp. ex. |
| 29 | 6.00 | 6.00 | 12.0000 | 0.76 | 5044.2 | 317.6 | 6.8 | 0.120 | 0.333 | 0.169 | Good | Good | Inv. ex. |
| 30 | 6.00 | 7.00 | 13.0000 | 0.73 | 7088.4 | 391.0 | 8.2 | 0.131 | 0.364 | 0.144 | Good | Good | Inv. ex. |
| 31 | 10.00 | 6.00 | 16.0000 | 1.18 | 68.5 | 405.5 | 12.4 | 0.211 | 0.623 | 0.150 | Poor | Good | Comp. ex. |
| 32 | 9.00 | 4.00 | 13.0000 | 1.27 | 67.2 | 55.5 | 13.1 | 0.149 | 0.544 | 0.077 | Poor | Good | Comp. ex. |
| 33 | 3.20 | 10.50 | 13.7000 | 0.26 | 55.4 | 103.5 | 8.8 | 0.235 | 0.244 | 0.255 | Poor | Good | Comp. ex. |
| 34 | 1.20 | 0.30 | 1.5000 | 2.83 | 59.0 | 219.6 | 3.2 | 0.027 | 0.064 | 0.014 | Good | Fair | Comp. ex. |
| 35 | 0.70 | 4.20 | 4.9000 | 0.12 | 60.2 | 405.5 | 1.9 | 0.038 | 0.073 | 0.128 | Good | Fair | Comp. ex. |
| 36 | 0.60 | 8.00 | 8.6000 | 0.14 | 61.8 | 992.5 | 1.9 | 0.032 | 0.044 | 0.268 | Good | Fair | Comp. ex. |
| 37 | 2.00 | 6.50 | 8.5000 | 0.14 | 63.2 | 1084.2 | 1.8 | 0.035 | 0.075 | 0.150 | Good | Fair | Comp. ex. |
| 38 | 0.80 | 4.00 | 4.8000 | 0.13 | 68.8 | 516.6 | 1.5 | 0.040 | 0.052 | 0.155 | Good | Fair | Comp. ex. |
| 39 | 0.50 | 4.00 | 4.5000 | 0.12 | 276.3 | 53.5 | 1.4 | 0.033 | 0.044 | 0.134 | Good | Fair | Comp. ex. |
| 40 | 0.80 | 0.80 | 1.6000 | 0.76 | 594.3 | 94.5 | 1.9 | 0.021 | 0.029 | 0.013 | Good | Poor | Comp. ex. |
| 41 | 7.00 | 8.00 | 15.0000 | 0.62 | 913.5 | 21.5 | 12.5 | 0.244 | 0.423 | 0.255 | Poor | Good | Comp. ex. |
| 42 | 0.75 | 7.80 | 8.5500 | 0.18 | 55.4 | 305.4 | 2.4 | 0.065 | 0.028 | 0.238 | Good | Good | Inv. ex. |
| 43 | 3.50 | 9.80 | 13.3000 | 0.17 | 102.5 | 40.6 | 8.2 | 0.122 | 0.227 | 0.241 | Good | Good | Inv. ex. |
| 44 | 7.80 | 1.00 | 8.8000 | 3.62 | 88.4 | 90.8 | 8.5 | 0.035 | 0.422 | 0.112 | Good | Good | Inv. ex. |
| 45 | 3.20 | 2.50 | 5.7000 | 1.26 | 203.5 | 21.5 | 2.1 | 0.032 | 0.152 | 0.064 | Good | Good | Inv. ex. |
| 46 | 3.00 | 3.00 | 6.0000 | 0.88 | 2044.5 | 1657.5 | 2.4 | 0.036 | 0.096 | 0.082 | Good | Good | Inv. ex. |
| 47 | 4.00 | 5.00 | 9.0000 | 0.59 | 20.9 | 21.5 | 2.6 | 0.032 | 0.120 | 0.102 | Good | Good | Inv. ex. |
| 48 | 3.00 | 3.50 | 6.5000 | 0.78 | 201.9 | 30.8 | 2.3 | 0.037 | 0.070 | 0.082 | Good | Good | Inv. ex. |
| 49 | 4.50 | 5.80 | 10.3000 | 0.45 | 4052.1 | 40.8 | 2.3 | 0.038 | 0.172 | 0.188 | Good | Good | Inv. ex. |
| 50 | 2.50 | 1.50 | 4.00 | 0.38 | 19.0 | 62.6 | 1.1 | 0.014 | 0.052 | 0.142 | Good | Fair | Comp. ex. |
| 51 | 2.40 | 1.80 | 4.20 | 0.81 | 18.4 | 71.6 | 1.3 | 0.018 | 0.042 | 0.166 | Good | Fair | Comp. ex. |
| 52 | 2.00 | 3.00 | 5.00 | 0.24 | 17.3 | 79.6 | 1.4 | 0.012 | 0.039 | 0.172 | Good | Fair | Comp. ex. |
| 53 | 2.90 | 3.00 | 5.90 | 0.93 | 16.8 | 54.9 | 1.4 | 0.011 | 0.033 | 0.167 | Good | Fair | Comp. ex. |
| 54 | 4.20 | 5.00 | 9.20 | 0.72 | 66.8 | 17.5 | 2.2 | 0.008 | 0.045 | 0.177 | Good | Fair | Comp. ex. |
| 55 | 3.40 | 4.50 | 7.90 | 0.20 | 302.4 | 16.2 | 2.4 | 0.006 | 0.048 | 0.172 | Good | Fair | Comp. ex. |
| 56 | 1.80 | 5.00 | 6.80 | 0.82 | 4006.5 | 5.8 | 2.1 | 0.004 | 0.028 | 0.153 | Good | Fair | Comp. ex. |
| 57 | 3.00 | 2.90 | 5.90 | 0.42 | 9811.5 | 12.5 | 2.2 | 0.008 | 0.044 | 0.187 | Good | Fair | Comp. ex. |

Number Density ND Measurement Test of Al Oxides

For each of the grain-oriented electrical steel sheets of the numbered tests, the Al oxide number density ND (/µm²) at the Al peak position $D_{Al}$ was found by the following method. Glow discharge was performed using a glow discharge optical emission analysis apparatus down to the Al peak position $D_{Al}$. Any 36 µm×50 µm region (observed region) in the discharge marks at the Al peak position $D_{Al}$ was analyzed for elements using an energy dispersive type X-ray spectroscope (EDS) to identify Al oxides in the observed region. The precipitates in the observed region containing Al and O were identified as Al oxides. The number of the identified Al oxides was counted, and the Al oxide number density ND (/µm²) was found by the following formula:

ND=Number of identified Al oxides/area of observed region.

The Al oxide number density ND found is shown in Table 4.

Measurement Test of Contents of Y, La, and Ce and Contents of Ti, Zr, and Hf in Primary Scale Each of the grain-oriented electrical steel sheets of the numbered tests was measured by the following method for the contents of Y, La, and Ce (mass %) and the contents of Ti, Zr, and Hf (mass %) in the primary coating. Specifically, the grain-oriented electrical steel sheet was electrolyzed to separate the primary coating alone from the surface of the base metal steel sheet. The Mg in the separated primary coating was quantitatively analyzed by ICP-MS. The product of the obtained quantized value (mass %) and the molecular weight of $Mg_2SiO_4$ was divided by the atomic weight of Mg to find the content of $Mg_2SiO_4$ equivalent. The Y, La, and Ce and the Ti, Zr, and Hf in the primary coating were measured by the following method. The grain-oriented electrical steel sheet was electrolyzed to separate the primary coating alone from the surface of the base metal steel sheet. The contents of Y, La, and Ce (mass %) and the contents of Ti, Zr, and Hf (mass %) in the separated primary coating were found by quantitative analysis by ICP-MS. The contents of Y, La, and Ce and the contents of Ti, Zr, and Hf obtained by measurement are shown in Table 4.

Magnetic Property Evaluation Test

Using the next method, the magnetic properties of each of the grain-oriented electrical steel sheets of the numbered tests were evaluated. Specifically, from each of the grain-oriented electrical steel sheets of the numbered tests, a sample of a rolling direction length of 300 mm×width 60 mm was taken. The sample was subjected to a magnetic field of 800 A/m to find the magnetic flux density B8. Table 4 shows the test results. In Table 4, a sample with a magnetic flux density of 1.92 T or more was evaluated as "Good", one of 1.88 T or more and less than 1.92 T as "Fair", and one of less than 1.88 T as "Poor". If the magnetic flux density is 1.92 T or more (that is, if "Good" in Table 4), it was judged that the magnetic properties were excellent.

Adhesion Evaluation Test

Using the next method, the adhesion of the primary coating of each of the grain-oriented electrical steel sheets of the numbered tests was evaluated. Specifically, a sample of a rolling direction length of 60 mm×width 15 mm was taken from each of the grain-oriented electrical steel sheets of the numbered tests. The sample was subjected to a flex test by a curvature of 10 mm. The flex test was performed using a bending resistance testing machine (made by TP Giken) while setting it at the sample so that the axial direction of the cylinder matched the width direction of the sample. The surface of the sample after the flex test was examined and the total area of the regions where the primary coating remained without being peeled off was found. The following formula was used to find the remaining rate of the primary coating.

Remaining rate of the primary coating=total area of regions in which primary coating remains without being peeled off/area of surface of sample×100.

Table 4 shows the test results. A sample with a remaining rate of the primary coating of 90% or more was shown as "Good", one of 70% or more and less than 90% as "Fair", and one of less than 70% as "Poor". If the remaining rate of the primary coating is 90% or more (that is, in Table 4, "Good"), it is judged that the adhesion of the primary coating with respect to the base steel sheet is excellent.

Test Results

Table 4 shows the test results. Referring to Tables 2 and 4, in Test Nos. 13, 18, 19, 24, 29, 30, and 42 to 49, the constituents of the annealing separator were suitable. Specifically, in these numbered tests, the total content $C_{RE}$ of the Y, La, and Ce compounds converted to oxides (the content $C_{RE}$ of Y, La, and Ce compounds converted to oxides) when defining the MgO content in the annealing separator as 100% by mass % was in the range of 0.5 to 8.0% and the total content $C_{G4}$ of the Ti, Zr, and Hf compounds converted to oxides (the content $C_{G4}$ of Ti, Zr, and Hf compounds converted to oxides) when defining the MgO content in the annealing separator as 100% by mass % was in the range of 0.5 to 10.0%. Furthermore, the total $(C_{RE}+C_{G4})$ of the contents of Y, La, and Ce compounds converted to oxides and the contents of Ti, Zr, and Hf compounds converted to oxides was in the range of 2.0 to 14.0%. Furthermore, the ratio $(X_{RE}/X_{G4})$ of the sum of the numbers of Y, La, and Ce atoms to the sum of the numbers of Ti, Zr, and Hf atoms contained in the annealing separator was in the range of 0.15 to 4.00. For this reason, the Al peak position $D_{Al}$ was in the range of 2.0 to 12.0 μm and the Al oxide number density ND was 0.03 to 0.2/μm². As a result, in these numbered tests, the primary coating exhibited excellent adhesion. Furthermore, it exhibited excellent magnetic properties.

Further, in particular, in Test Nos. 13, 29, 30, and 45 to 49, at least two types or more of compounds of metal selected from the group comprised of Ti, Zr, and Hf are contained. The primary coating exhibited extremely excellent adhesion, and extremely excellent magnetic properties were exhibited.

On the other hand, in Test Nos. 1, 2, 3, 4, 5, and 6, the content $C_{RE}$ of Y, La, and Ce compounds converted to oxides was too low and Further, the total $(C_{RE}+C_{G4})$ of the content of Y, La, and Ce compounds converted to oxides and the content of Ti, Zr, and Hf compounds converted to oxide and the ratio $(X_{RE}/X_{G4})$ of the sum of the numbers of Y, La, and Ce atoms with respect to the sum of the numbers of Ti, Zr, and Hf atoms were also too low. For this reason, the Al peak position $D_{Al}$ and a number density ND of Al oxides were too low. As a result, the adhesion of the primary coating was low.

In Test Nos. 7 and 8, the content $C_{RE}$ of Y, La, and Ce compounds converted to oxides was too low and the total $(C_{RE}+C_{G4})$ of the content of Y, La, and Ce compounds converted to oxides and the content of Ti, Zr, and Hf compounds converted to oxides was also too low. For this reason, the Al peak position $D_{Al}$ was too low and the Al oxide number density ND was too small. As a result, the adhesion of the primary coating was low.

In Test Nos. 9, 20, and 28, none of the Ti, Hf, and Zr compounds were contained. For this reason, the Al oxide number density ND was too small. As a result, the adhesion of the primary coating was low.

In Test Nos. 10, 16, and 21, none of the Y, La, and Ce compounds were contained either. For this reason, the Al peak position $D_{Al}$ was too low and the Al oxide number density ND was too small. As a result, the adhesion of the primary coating was low.

In Test Nos. 11 and 12, the content $C_{RE}$ of Y, La, and Ce compounds converted to oxides was low. For this reason, the Al peak position $D_{Al}$ was too low. As a result, the adhesion of the primary coating was low.

In Test Nos. 14 and 15, the content $C_{G4}$ of Ti, Zr, and Hf compounds converted to oxides was low and the ratio $(X_{RE}/X_{G4})$ of the sum of the numbers of Y, La, and Ce atoms with respect to the sum of the numbers of Ti, Zr, and Hf atoms was high. For this reason, the Al oxide number density ND was too low. As a result, the adhesion of the primary coating was low.

In Test No. 17, the content $C_{RE}$ of Y, La, and Ce compounds converted to oxides was too low and the ratio ($X_{RE}/X_{G4}$) of the sum of the numbers of Y, La, and Ce atoms with respect to the sum of the numbers of Ti, Zr, and Hf atoms was too low. For this reason, the Al peak position $D_{Al}$ was too low and the Al oxide number density ND was too small. As a result, the adhesion of the primary coating was low.

In Test Nos. 22 and 23, the content $C_{G4}$ of Ti, Zr, and Hf compounds converted to oxides was too high and the ratio ($X_{RE} A_{G4}$) of the sum of the numbers of Y, La, and Ce atoms with respect to the sum of the numbers of Ti, Zr, and Hf atoms was too low. For this reason, the Al peak position $D_{Al}$ was too low. As a result, the adhesion of the primary coating was low.

In Test Nos. 25, 26, and 27, the ratio ($X_{RE}/X_{G4}$) of the sum of the numbers of Y, La, and Ce atoms with respect to the sum of the numbers of Ti, Zr, and Hf atoms was too high. For this reason, the Al oxide number density ND was too small. As a result, the adhesion of the primary coating was low.

In Test No. 31, the total ($C_{RE}+C_{G4}$) of the content of Y, La, and Ce compounds converted to oxides and the content $C_{RE}$ of Y, La, and Ce compounds converted to oxides and the content of Ti, Zr, and Hf compounds converted to oxides were too high. For this reason, the Al peak position $D_{Al}$ was too high and the Al oxide number density ND was too great. As a result, the magnetic properties were low.

In Test No. 32, the content $C_{RE}$ of Y, La, and Ce compounds converted to oxides was too high. For this reason, the Al peak position $D_{Al}$ was too high. As a result, the magnetic properties were low.

In Test No. 33, the content $C_{G4}$ of Ti, Zr, and Hf compounds converted to oxides was too high. For this reason, the Al oxide number density ND was too great. As a result, the magnetic properties were low.

In Test No. 34, the content $C_{G4}$ of Ti, Zr, and Hf compounds converted to oxides was too low. For this reason, the Al oxide number density ND was too small. As a result, the adhesion of the primary coating was low.

In Test Nos. 35, 36, 37, 38, and 39, the ratio ($X_{RE}/X_{G4}$) of the sum of the numbers of Y, La, and Ce atoms with respect to the sum of the numbers of Ti, Zr, and Hf atoms was too low. For this reason, the Al peak position $D_{Al}$ was too low. As a result, the adhesion of the primary coating was low.

In Test No. 40, the total ($C_{RE}+C_{G4}$) of the content of Y, La, and Ce compounds converted to oxides and the content of Ti, Zr, and Hf compounds converted to oxides was too low. For this reason, the Al peak position $D_{Al}$ was too low and the Al oxide number density ND was too small. As a result, the adhesion of the primary coating was low.

In Test No. 41, the total ($C_{RE}+C_{G4}$) of the content of Y, La, and Ce compounds converted to oxides and the content of Ti, Zr, and Hf compounds converted to oxides was too high. For this reason, the Al peak position $D_{Al}$ was too high and the Al oxide number density ND was too high. As a result, the magnetic properties were low.

In Test Nos. 50 to 53, the number density of particles in the raw material powder of the annealing separator of the Y, La, and Ce compounds was too small. For this reason, the Al peak position $D_{Al}$ was too low and the Al oxide number density ND was too small. As a result, the adhesion of the primary coating was low.

In Test Nos. 54 to 57, the number density of particles in the raw material powder of the annealing separator of the Ti, Zr, and Hf compound was too small. For this reason, the Al oxide number density ND was too small. As a result, the adhesion of the primary coating was low.

Example 2

Manufacture of Grain-Oriented Electrical Steel Sheet

In the same way as Example 1, each of the cold rolled steel sheet after primary recrystallization annealing of Test Nos. 58 to 70 manufactured from molten steel of the chemical compositions shown in Table 1 was coated with an aqueous slurry and made to dry to coat the annealing separator on one side by a ratio of 5 g/m². Note that, the aqueous slurry was prepared by mixing the annealing separator and pure water for industrial use in a mixing ratio of 1:2. The annealing separator contained MgO, the additives shown in Table 5, and, when defining the MgO content as 100% by mass %, 2.5% of $CeO_2$, 4.0% of $ZrO_2$, and 2.0% of $TiO_2$. Note that, the Y, La, and Ce content $C_{RE}$ in the annealing separator shown in Table 5 means the total content of the Y, La, and Ce compounds converted to oxides when defining the MgO content in the annealing separator as 100% by mass %. In the same way, the abundance ratio $X_{RE}$ of Y, La, and Ce atoms shown in Table 5 means the ratio of the sum of the numbers of Y, La, and Ce atoms to the number of Mg atoms contained in the annealing separator. In the same way, the content $C_{G4}$ of Ti, Zr, and Hf in the annealing separator shown in Table 5 means the total content of the Ti, Zr, and Hf compounds converted to oxides when defining the MgO content in the annealing separator as 100% by mass %. In the same way, the abundance ratio $X_{G4}$ of Ti, Zr, and Hf atoms shown in Table 5 means the ratio of the sum of the numbers of Ti, Zr, and Hf atoms with respect to the number of Mg atoms contained in the annealing separator. Further, in the same way, the abundance ratio $X_{AM}$ of Ca, Sr, and Ba atoms shown in Table 5 means the ratio of the sum of the numbers of Ca, Sr, and Ba atoms with respect to the number of Mg atoms contained in the annealing separator.

TABLE 5

| Test no. | Hot rolled steel sheet steel type | Y, La, Ce content $C_{RE}$ (wt %) | Ti, Zr, Hf content $C_{G4}$ (wt %) | Total content $C_{RE}+C_{G4}$ (wt %) | Y, La, Ce existence ratio $X_{RE}$ | Ti, Zr, Hf existence ratio $X_{G4}$ | $X_{RE}/X_{G4}$ | Y, La, Ce number density $N_{RE}$ (100,000,000/g) | Ti, Zr, Hf number density $N_{RE}$ (1000,000,000/g) | $CaSO_4$ content (wt %) | $SrSO_4$ content (wt %) | $BaSO_4$ content (wt %) | $X_{AM}$ | Remarks |
|---|---|---|---|---|---|---|---|---|---|---|---|---|---|---|
| 58 | A | 2.50 | 6.00 | 8.5000 | 0.0059 | 0.0232 | 0.25 | 405.3 | 304.2 | 3.30 | 0.00 | 0.00 | 0.010 | Inv. ex. |
| 59 | A | 2.50 | 6.00 | 8.5000 | 0.0059 | 0.0232 | 0.25 | 405.3 | 304.2 | 0.00 | 4.40 | 0.00 | 0.010 | Inv. ex. |
| 60 | A | 2.50 | 6.00 | 8.5000 | 0.0059 | 0.0232 | 0.25 | 405.3 | 304.2 | 0.00 | 0.00 | 5.50 | 0.010 | Inv. ex. |
| 61 | A | 2.50 | 6.00 | 8.5000 | 0.0059 | 0.0232 | 0.25 | 405.3 | 304.2 | 8.50 | 0.00 | 0.00 | 0.025 | Comp. ex. |
| 62 | B | 2.50 | 6.00 | 8.5000 | 0.0059 | 0.0232 | 0.25 | 2093.5 | 304.2 | 6.00 | 0.00 | 0.00 | 0.018 | Inv. ex. |
| 63 | B | 2.50 | 6.00 | 8.5000 | 0.0059 | 0.0232 | 0.25 | 2093.5 | 304.2 | 0.00 | 8.00 | 0.00 | 0.018 | Inv. ex. |

TABLE 5-continued

| Test no. | Hot rolled steel sheet steel type | Y, La, Ce content $C_{RE}$ (wt %) | Ti, Zr, Hf content $C_{G4}$ (wt %) | Total content $C_{RE} + C_{G4}$ | Y, La, Ce existence ratio $X_{RE}$ | Ti, Zr, Hf existence ratio $X_{G4}$ | $X_{RE}/X_{G4}$ | Y, La, Ce number density $N_{RE}$ (100,000,000/g) | Ti, Zr, Hf number density $N_{RE}$ (1000,000,000/g) | $CaSO_4$ content (wt %) | $SrSO_4$ content (wt %) | $BaSO_4$ content (wt %) | $X_{AM}$ | Remarks |
|---|---|---|---|---|---|---|---|---|---|---|---|---|---|---|
| 64 | B | 2.50 | 6.00 | 8.5000 | 0.0059 | 0.0232 | 0.25 | 2093.5 | 304.2 | 0.15 | 0.00 | 10.00 | 0.018 | Inv. ex. |
| 65 | B | 2.50 | 6.00 | 8.5000 | 0.0059 | 0.0232 | 0.25 | 2093.5 | 5013.2 | 0.00 | 6.00 | 8.00 | 0.027 | Comp. ex. |
| 66 | C | 2.50 | 6.00 | 8.5000 | 0.0059 | 0.0232 | 0.25 | 2093.5 | 5013.2 | 3.50 | 0.00 | 0.00 | 0.010 | Inv. ex. |
| 67 | D | 2.50 | 6.00 | 8.5000 | 0.0059 | 0.0232 | 0.25 | 2093.5 | 5013.2 | 0.00 | 3.50 | 0.00 | 0.008 | Inv. ex. |
| 68 | E | 2.50 | 6.00 | 8.5000 | 0.0059 | 0.0232 | 0.25 | 2093.5 | 5013.2 | 0.00 | 0.00 | 4.00 | 0.007 | Inv. ex. |
| 69 | F | 2.50 | 6.00 | 8.5000 | 0.0059 | 0.0232 | 0.25 | 405.3 | 5013.2 | 0.00 | 0.00 | 4.00 | 0.007 | Inv. ex. |
| 70 | G | 2.50 | 6.00 | 8.5000 | 0.0059 | 0.0232 | 0.25 | 405.3 | 5013.2 | 0.00 | 0.00 | 4.00 | 0.007 | Inv. ex. |

The cold rolled steel sheet on the surface of which the aqueous slurry was coated was, in each of the numbered tests, loaded into a 900° C. furnace for 10 seconds to dry the aqueous slurry. After drying, it was treated by finish annealing. In the finish annealing treatment, in each of the numbered tests, the steel sheet was held at 1200° C. for 20 hours. Due to the above manufacturing process, grain-oriented electrical steel sheet having a base metal steel sheet and a primary coating was manufactured.

Analysis of Chemical Composition of Base Metal Steel Sheet of Grain-Oriented Electrical Steel Sheet The base metal steel sheets of the grain-oriented electrical steel sheets of Test Nos. 58 to 70 manufactured were examined by spark discharge optical emission spectrometry and atomic adsorption spectrometry to find the chemical compositions of the base metal steel sheets. The found chemical compositions are shown in Table 6.

TABLE 6

| Test no. | Chemical composition (unit: mass %, balance of Fe and impurities) | | | | | | | | | | | | |
|---|---|---|---|---|---|---|---|---|---|---|---|---|---|
| | C | Si | Mn | S | Se | S + Se | sol. Al | N | Sn | Sb | Bi | Te | Pb |
| 58 | 0.0005 | 3.3 | 0.077 | 0.001 | <0.0005 | <0.0015 | 0.002 | 0.002 | <0.0005 | <0.0005 | <0.0005 | <0.0005 | <0.0005 |
| 59 | 0.0005 | 3.3 | 0.076 | 0.001 | <0.0005 | <0.0015 | 0.002 | 0.001 | <0.0005 | <0.0005 | <0.0005 | <0.0005 | <0.0005 |
| 60 | 0.0005 | 3.2 | 0.077 | 0.001 | <0.0005 | <0.0015 | 0.002 | 0.002 | <0.0005 | <0.0005 | <0.0005 | <0.0005 | <0.0005 |
| 61 | 0.0005 | 3.3 | 0.079 | 0.001 | <0.0005 | <0.0015 | 0.002 | 0.001 | <0.0005 | <0.0005 | <0.0005 | <0.0005 | <0.0005 |
| 62 | 0.0005 | 3.4 | 0.077 | <0.0005 | 0.001 | <0.0015 | 0.003 | 0.002 | <0.0005 | <0.0005 | <0.0005 | <0.0005 | <0.0005 |
| 63 | 0.0005 | 3.3 | 0.075 | <0.0005 | 0.001 | <0.0015 | 0.002 | 0.001 | <0.0005 | <0.0005 | <0.0005 | <0.0005 | <0.0005 |
| 64 | 0.0005 | 3.3 | 0.072 | <0.0005 | 0.001 | <0.0015 | 0.002 | 0.002 | <0.0005 | <0.0005 | <0.0005 | <0.0005 | <0.0005 |
| 65 | 0.0005 | 3.3 | 0.074 | <0.0005 | 0.001 | <0.0015 | 0.002 | 0.003 | <0.0005 | <0.0005 | <0.0005 | <0.0005 | <0.0005 |
| 66 | 0.0005 | 3.2 | 0.077 | 0.001 | 0.001 | 0.002 | 0.002 | 0.001 | 0.0200 | <0.0005 | <0.0005 | <0.0005 | <0.0005 |
| 67 | 0.0005 | 3.2 | 0.072 | 0.001 | 0.001 | 0.002 | 0.002 | 0.001 | <0.0005 | 0.0010 | <0.0005 | <0.0005 | <0.0005 |
| 68 | 0.0005 | 3.3 | 0.076 | 0.001 | 0.001 | 0.002 | 0.002 | 0.002 | <0.0005 | <0.0005 | 0.0008 | <0.0005 | <0.0005 |
| 69 | 0.0005 | 3.3 | 0.078 | 0.001 | 0.001 | 0.002 | 0.002 | 0.002 | <0.0005 | <0.0005 | <0.0005 | 0.0005 | <0.0005 |
| 70 | 0.0005 | 3.2 | 0.077 | 0.001 | 0.001 | 0.002 | 0.003 | 0.002 | <0.0005 | <0.0005 | <0.0005 | <0.0005 | 0.0005 |

Evaluation Test of Coating

For each of the oriented electric steel sheet of the number tests, in the same way as Example 1, the Al peak position $D_{Al}$, the Al oxide number density ND ($/\mu m^2$) at the Al peak position $D_{Al}$, and the contents of Y, La, and Ce and the contents of Ti, Zr, and Hf in the primary coating were found. The Al peak position $D_{Al}$, Al oxide number density ND, and the contents of Y, La, and Ce and the contents of Ti, Zr, and Hf in the primary coating found by measurement are shown in Table 7.

TABLE 7

| Test no. | Additives in annealing separator | | | | | | | Primary coating | | | | Evaluation test | | Remarks |
|---|---|---|---|---|---|---|---|---|---|---|---|---|---|---|
| | Total content $C_{RE} + C_{G4}$ | Y, La, Ce existence ratio $X_{RE}$ | Ti, Zr, Hf existence ratio $X_{G4}$ | $X_{RE}/X_{G4}$ | $X_{AM}$ | Y, La, Ce number density $N_{RE}$ (100,000,000/g) | Ti, Zr, Hf number density $N_{RE}$ (100,000,000/g) | $D_{Al}$ (μm) | ND ($/\mu m^2$) | Y, La Ce content (%) | Ti, Zr, Hf content (%) | Magnetism | Adhesion | |
| 58 | 8.5000 | 0.0059 | 0.0232 | 0.25 | 0.010 | 405.3 | 304.2 | 5.2 | 0.035 | 0.131 | 0.122 | Good | Good | Inv. ex. |
| 59 | 8.5000 | 0.0059 | 0.0232 | 0.25 | 0.010 | 405.3 | 304.2 | 5.8 | 0.032 | 0.107 | 0.141 | Good | Good | Inv. ex. |

TABLE 7-continued

| | | Additives in annealing separator | | | | | Primary coating | | | | Evaluation test | | |
|---|---|---|---|---|---|---|---|---|---|---|---|---|---|
| | | Y, La, Ce | Ti, Zr, Hf | | | Y, La, Ce | Ti, Zr, Hf | | | Y, La, Ce | Ti, Zr, Hf | | |
| | Total | existence | existence | | | number | number | | | | | | |
| | content | ratio | ratio | | | density $N_{RE}$ | density $N_{RE}$ | | | | | | |
| Test | $C_{RE} + C_{G4}$ | $X_{RE}$ | $X_{G4}$ | $X_{RE}/X_{G4}$ | $X_{AM}$ | (100,000,000/g) | (100,000,000/g) | $D_{Al}$ (μm) | ND (/μm²) | content (%) | content (%) | Magne-tism | Adhe-sion | Remarks |
|---|---|---|---|---|---|---|---|---|---|---|---|---|---|---|
| 60 | 8.5000 | 0.0059 | 0.0232 | 0.25 | 0.010 | 405.3 | 304.2 | 5.4 | 0.038 | 0.116 | 0.139 | Good | Good | Inv. ex. |
| 61 | 8.5000 | 0.0059 | 0.0232 | 0.25 | 0.025 | 405.3 | 304.2 | 1.9 | 0.031 | 0.116 | 0.129 | Good | Fair | Comp. ex. |
| 62 | 8.5000 | 0.0059 | 0.0232 | 0.25 | 0.018 | 2093.5 | 304.2 | 3.2 | 0.042 | 0.108 | 0.132 | Good | Good | Inv. ex. |
| 63 | 8.5000 | 0.0059 | 0.0232 | 0.25 | 0.018 | 2093.5 | 304.2 | 2.9 | 0.036 | 0.104 | 0.148 | Good | Good | Inv. ex. |
| 64 | 8.5000 | 0.0059 | 0.0232 | 0.25 | 0.018 | 2093.5 | 304.2 | 3.7 | 0.038 | 0.107 | 0.145 | Good | Good | Inv. ex. |
| 65 | 8.5000 | 0.0059 | 0.0232 | 0.25 | 0.027 | 2093.5 | 5013.2 | 1.8 | 0.031 | 0.108 | 0.129 | Good | Fair | Comp. ex. |
| 66 | 8.5000 | 0.0059 | 0.0232 | 0.25 | 0.010 | 2093.5 | 5013.2 | 4.2 | 0.032 | 0.117 | 0.132 | Good | Good | Inv. ex. |
| 67 | 8.5000 | 0.0059 | 0.0232 | 0.25 | 0.008 | 2093.5 | 5013.2 | 4.6 | 0.040 | 0.108 | 0.145 | Good | Good | Inv. ex. |
| 68 | 8.5000 | 0.0059 | 0.0232 | 0.25 | 0.007 | 2093.5 | 5013.2 | 4.8 | 0.034 | 0.110 | 0.144 | Good | Good | Inv. ex. |
| 69 | 8.5000 | 0.0059 | 0.0232 | 0.25 | 0.007 | 405.3 | 5013.2 | 4.8 | 0.035 | 0.110 | 0.144 | Good | Good | Inv. ex. |
| 70 | 8.5000 | 0.0059 | 0.0232 | 0.25 | 0.007 | 405.3 | 5013.2 | 4.8 | 0.033 | 0.110 | 0.144 | Good | Good | Inv. ex. |

Magnetic Property Evaluation Test

Using a method similar to Example 1, the magnetic properties of each of the grain-oriented electrical steel sheets of the numbered tests were evaluated. Table 7 shows the test results. In the same way as Example 1, in Table 7, a sample with a magnetic flux density of 1.92 T or more was evaluated as "Good", one of 1.88 T or more and less than 1.92 T as "Fair", and one of less than 1.88 T as "Poor". If the magnetic flux density is 1.92 T or more (that is, if "Good" in Table 7), it was judged that the magnetic properties were excellent.

Adhesion Evaluation Test

Using a method similar to Example 1, the adhesion of the primary coating of each of the grain-oriented electrical steel sheets of the numbered tests was evaluated. Table 7 shows the test results. In the same way as Example 1, in Table 7, a sample with a remaining rate of the primary coating of 90% or more was shown as "Good", one of 70% or more and less than 90% as "Fair", and one of less than 70% as "Poor". If the remaining rate of the primary coating is 90% or more (that is, in Table 7, "Good"), it is judged that the adhesion of the primary coating with respect to the base steel sheet was excellent.

Test Results

Table 7 shows the test results. Referring to Tables 5 and 7, in Test Nos. 58 to 60, 62 to 64, and 66 to 70, the constituents of the annealing separator were suitable. Specifically, the total content $C_{RE}$ of the Y, La, and Ce compounds converted to oxides (the content $C_{RE}$ of Y, La, and Ce compounds converted to oxides) when defining the MgO content in the annealing separator as 100% by mass % was in the range of 0.5 to 8.0% and the total content $C_{G4}$ of the Ti, Zr, and Hf compounds converted to oxides (the content $C_{G4}$ of Ti, Zr, and Hf compounds converted to oxides) when defining the MgO content in the annealing separator as 100% by mass % was in the range of 0.5 to 10.0%. Furthermore, the total ($C_{RE}+C_{G4}$) of the contents of Y, La, and Ce compounds converted to oxides and the contents of Ti, Zr, and Hf compounds converted to oxides was in the range of 2.0 to 14.0%. Furthermore, the ratio ($X_{RE}/X_{G4}$) of the sum of the numbers of Y, La, and Ce atoms to the sum of the numbers of Ti, Zr, and Hf atoms contained in the annealing separator was in the range of 0.15 to 4.00 and further the ratio ($X_{AM}$) of the sum of the numbers of Ca, Sr, and Ba atoms with respect to the number of Mg atoms contained in the annealing separator was less than 0.025. For this reason, the Al peak position $D_{Al}$ was in the range of 2.0 to 12.0 μm and the Al oxide number density ND was 0.03 to 0.2/μm². As a result, in these numbered tests, the primary coating exhibited excellent adhesion. Furthermore, it exhibited excellent magnetic properties.

On the other hand, in Test Nos. 61 and 65, the ratio ($X_{AM}$) of the sum of the numbers of Ca, Sr, and Ba atoms with respect to the number of Mg atoms contained in annealing separator was 0.025 or more. For this reason, the Al peak position $D_{Al}$ was too low. As a result, the adhesion of the primary coating was low.

Above, embodiments of the present invention were explained. However, the embodiments explained above are only illustrations for working the present invention. Therefore, the present invention is not limited to the embodiments explained above and can be worked while suitably changing the embodiments explained above within a scope not deviating from its gist.

The invention claimed is:

1. A grain-oriented electrical steel sheet comprising
   a base metal steel sheet having a chemical composition containing, by mass %,
   C: 0.005% or less,
   Si: 2.5 to 4.5%,
   Mn: 0.02 to 0.2%,
   one or more elements selected from the group comprised of S and Se: total of 0.005% or less,
   sol. Al: 0.01% or less, and
   N: 0.01% or less and
   having a balance comprised of Fe and impurities and
   a primary coating formed on a surface of the base metal steel sheet and containing $Mg_2SiO_4$ as a main constituent, where
   a peak position of Al emission intensity obtained when performing elemental analysis by glow discharge optical emission spectrometry from a surface of the primary coating in a thickness direction of the grain-oriented electrical steel sheet is arranged within a range of 2.0 to 12.0 μm from the surface of the primary coating in the thickness direction and
   a number density of Al oxides of a size of 0.2 μm or more in terms of a circle equivalent diameter based on the area at the peak position of Al emission intensity is 0.03 to 0.2/μm².

2. A method for manufacturing the grain-oriented electrical steel sheet according to claim 1, the method comprising a process for cold rolling hot rolled steel sheet containing by mass %,
C: 0.1% or less,
Si: 2.5 to 4.5%,
Mn: 0.02 to 0.2%,
one or more elements selected from the group comprised of S and Se: total of 0.005 to 0.07%,
sol. Al: 0.005 to 0.05%, and
N: 0.001 to 0.030% and
having a balance comprised of Fe and impurities by a cold rolling rate of 80% or more to manufacture cold rolled steel sheet,
a process for decarburization annealing the cold rolled steel sheet,
a process for coating the surface of the cold rolled steel sheet after decarburization annealing with an aqueous slurry containing an annealing separator and drying the aqueous slurry on the surface of the cold rolled steel sheet in a 400 to 1000° C. furnace, and
a process for performing finish annealing on the cold rolled steel sheet after the aqueous slurry has been dried, where
the annealing separator contains
MgO,
at least one or more types of compounds of metal selected from a group comprised of Y, La, and Ce, and
at least one or more types of compounds of metal selected from a group comprised of Ti, Zr, and Hf,
when a content of the MgO in the annealing separator is defined as 100% by mass %, a total content of the compounds of metal selected from a group comprised of Y, La, and Ce converted to oxides is 0.5 to 8.0% and a total content of the compounds of metal selected from a group comprised of Ti, Zr, and Hf converted to oxides is 0.5 to 10.0%,
further, a total of the total content of the compounds of metal selected from a group comprised of Y, La, and Ce converted to oxides and the total content of the compounds of metal selected from a group comprised of Ti, Zr, and Hf converted to oxides is 2.0 to 14.0%,
further a ratio of a sum of the numbers of Ti, Zr, and Hf atoms and a sum of the numbers of Y, La, and Ce atoms contained in the annealing separator is 0.15 to 4.00,
further a number density of particles of the compounds of metal selected from the group comprised of Y, La, and Ce which are particles of a spherical equivalent diameter based on volume of 0.1 µm or more is 2,000,000,000/g or more, and
further a number density of particles of the compounds of metal selected from the group comprised of Ti, Zr, and Hf which are particles of a spherical equivalent diameter based on volume of 0.1 µm or more is 2,000,000,000/g or more.

3. The method for manufacturing grain-oriented electrical steel sheet according to claim 2, in which method for manufacturing grain-oriented electrical steel sheet,
the annealing separator further contains at least one or more types of a compound of metal selected from the group comprised of Ca, Sr, and Ba, and
a ratio of a sum of the numbers of Ca, Sr, and Ba atoms with respect to the number of Mg atoms contained in the annealing separator is less than 0.025.

4. The method for manufacturing grain-oriented electrical steel sheet according to claim 2, in which method for manufacturing grain-oriented electrical steel sheet,
the chemical composition of the hot rolled steel sheet further contains, in place of part of the Fe, one or more elements selected from a group comprised of Cu, Sb and Sn in a total of 0.6% or less.

5. The method for manufacturing grain-oriented electrical steel sheet according to claim 2, in which method for manufacturing grain-oriented electrical steel sheet,
the chemical composition of the hot rolled steel sheet further contains, in place of part of the Fe, one or more elements selected from the group comprised of Bi, Te, and Pb in a total of 0.03% or less.

* * * * *